(12) United States Patent
Chen et al.

(10) Patent No.: US 12,113,625 B2
(45) Date of Patent: Oct. 8, 2024

(54) HARQ-ACK FEEDBACK METHOD AND APPARATUS

(71) Applicant: VIVO MOBILE COMMUNICATION CO., LTD., Guangdong (CN)

(72) Inventors: Xiaohang Chen, Guangdong (CN); Zhi Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/152,866

(22) Filed: Jan. 11, 2023

(65) Prior Publication Data
US 2023/0171037 A1 Jun. 1, 2023

Related U.S. Application Data

(63) Continuation of application No. PCT/CN2021/105514, filed on Jul. 9, 2021.

(30) Foreign Application Priority Data

Jul. 13, 2020 (CN) .......................... 202010670693.0

(51) Int. Cl.
*H04L 1/1812* (2023.01)
*H04L 1/00* (2006.01)
*H04L 5/00* (2006.01)

(52) U.S. Cl.
CPC .......... *H04L 1/1812* (2013.01); *H04L 1/0009* (2013.01); *H04L 5/0055* (2013.01)

(58) Field of Classification Search
CPC ... H04L 1/1812; H04L 1/1614; H04L 1/1822; H04L 1/1854; H04L 1/1861; H04L 5/0055
See application file for complete search history.

(56) References Cited

U.S. PATENT DOCUMENTS

2018/0278373 A1 9/2018 Wang et al.
2019/0356455 A1* 11/2019 Yang ..................... H04L 5/0055
(Continued)

FOREIGN PATENT DOCUMENTS

CN 110505040 A 11/2019
CN 110677222 A 1/2020
(Continued)

OTHER PUBLICATIONS

Lenovo, Motorola Mobility, HARQ enhancement for NR-U, Discussion & Decision, 3GPP TSG RAN WG1 #97, R1-1906283, May 13-17, 2019, Reno, USA.
(Continued)

*Primary Examiner* — Shelly A Chase
(74) *Attorney, Agent, or Firm* — Price Heneveld LLP

(57) ABSTRACT

A HARQ-ACK feedback method and apparatus are provided, so as to solve a problem that a terminal cannot perform HARQ-ACK feedback in a case that the terminal is configured with a DL SPS. The method may be applied to a terminal. The method includes determining, based on first information, a HARQ-ACK codebook corresponding to M DL SPS configurations; where the first information includes at least one of the following: first HARQ-ACK feedback indication information, first TDD configuration information, or first dynamic slot format information; and M≥1, and M is an integer.

20 Claims, 9 Drawing Sheets

200

Determine, based on first information, a HARQ-ACK codebook corresponding to M DL SPS configurations, where the first information includes at least one of the following: first HARQ-ACK feedback indication information, first TDD configuration information, and first dynamic slot format information ~ S202

(56) References Cited

U.S. PATENT DOCUMENTS

| | | | |
|---|---|---|---|
| 2020/0213044 A1 | 7/2020 | Peng et al. | |
| 2020/0213981 A1 | 7/2020 | Park et al. | |
| 2021/0050948 A1 | 2/2021 | Gao et al. | |
| 2021/0159948 A1 | 5/2021 | Li et al. | |
| 2021/0218537 A1 | 7/2021 | Chen et al. | |
| 2021/0344455 A1 | 11/2021 | Choi et al. | |
| 2022/0159692 A1* | 5/2022 | Lee | H04L 5/0053 |
| 2022/0385412 A1* | 12/2022 | Zhang | H04L 1/1812 |

FOREIGN PATENT DOCUMENTS

| | | |
|---|---|---|
| CN | 110830151 A | 2/2020 |
| EP | 3879736 A1 | 9/2021 |
| WO | 2019153964 A1 | 8/2019 |
| WO | 2020096438 A1 | 5/2020 |

OTHER PUBLICATIONS

Institute for Information Industry (III), Enhancements to DL SPS, 3GPP TSG RAN WGI #99, RI-1912778, Nov. 18-22, 2019, Reno, USA.

Moderator (LG Electronics), Summary of [101-e-NR-L 1 enh-URLLC-I lo Tenh-03], 3GPP TSG-RAN WG1 Meeting #101-e, R1-2004975, a-Meeting, May 25-Jun. 5, 2020.

Oppo, DL SPS enhancement, 3GPP TSG RAN WG1 #100-E, R1-2000485, Feb. 24-28, 2020, Athens, Greece.

* cited by examiner

200

Determine, based on first information, a HARQ-ACK codebook corresponding to M DL SPS configurations, where the first information includes at least one of the following: first HARQ-ACK feedback indication information, first TDD configuration information, and first dynamic slot format information ～ S202

HARQ-ACK FEEDBACK METHOD AND APPARATUS

CROSS-REFERENCE TO RELATED APPLICATIONS

This application is a continuation application of International Application No. PCT/CN2021/105514 filed on Jul. 9, 2021, which claims priority to Chinese Patent Application No. 202010670693.0, filed in China on Jul. 13, 2020 and entitled "HARQ-ACK FEEDBACK METHOD AND APPARATUS", which are incorporated herein by reference in their entireties.

TECHNICAL FIELD

This application pertains to the field of communication technologies, and specifically, relates to a hybrid automatic repeat request-acknowledgement (HARQ-ACK) feedback method and apparatus.

BACKGROUND

In order to reduce overheads of downlink control signaling for a periodic service with a fixed packet size, a network-side device may continuously allocate some resources in a semi-persistent scheduling (SPS) manner for transmission of the periodic service. Such downlink (DL) SPS manner can reduce overheads for scheduling voice over long-term evolution (VoLTE) voice packets (mainly reducing overheads of physical downlink control channel (PDCCH)) periodically sent, so that more resources are available for scheduling other terminals.

For a HARQ-ACK process that supports transport block (TB) level feedback, each TB corresponds to feedback of one HARQ-ACK bit, each terminal may have a plurality of downlink HARQ processes, or each terminal may have a a single DL HARQ process. From a perspective of terminals, HARQ-ACK feedback of a plurality of physical downlink shared channels (PDSCH) may be transmitted in one uplink data/control area in terms of time, and forms a HARQ-ACK codebook in this uplink data/control area.

When a terminal is configured with one or more DL SPSs, the terminal may be unable to perform HARQ-ACK feedback. Specifically, for example, a terminal is configured with a high-priority DL SPS for transmitting high-reliability or low-latency services. The high-priority DL SPS configuration generally has a relatively short periodicity. When receiving a high-priority DL SPS PDSCH transmission, the terminal generates a HARQ-ACK codebook according to HARQ-ACK timing. Because high-priority SPS PDSCHs are transmitted frequently, high-priority HARQ-ACK transmissions may collide with a slot format. If a collision occurs, the terminal discards the high-priority HARQ-ACK transmissions, which affects transmission performance for high-priority DL SPS data.

Therefore, it is necessary to provide a technical solution related to HARQ-ACK codebook determining/transmission to solve the above technical problems.

SUMMARY

Embodiments of this application are intended to provide a HARQ-ACK feedback method and apparatus.

According to a first aspect, a HARQ-ACK feedback method is provided, which is applied to a terminal. The method includes determining, based on first information, a HARQ-ACK codebook corresponding to M downlink semi-persistent scheduling DL SPS configurations; where the first information includes at least one of the following: first HARQ-ACK feedback indication information, first time division duplexing TDD configuration information, or first dynamic slot format information; and M≥1, and M is an integer.

According to a second aspect, a HARQ-ACK feedback apparatus is provided, including a determining module that is configured to determine, based on first information, a HARQ-ACK codebook corresponding to M downlink semi-persistent scheduling DL SPS configurations; where the first information includes at least one of the following: first HARQ-ACK feedback indication information, first time division duplexing TDD configuration information, or first dynamic slot format information; and M≥1, and M is an integer.

According to a third aspect, a terminal is provided. The terminal includes a processor, a memory, and a program or instructions stored in the memory and capable of running on the processor, where when the program or instructions are executed by the processor, the method according to the first aspect is implemented.

According to a fourth aspect, a readable storage medium is provided. The readable storage medium stores a program or instructions, and when the program or instructions are executed by a processor, the method according to the first aspect is implemented.

According to a fifth aspect, a chip is provided. The chip includes a processor and a communication interface, where the communication interface is coupled to the processor, and the processor is configured to run a program or instructions to implement the method according to the first aspect.

In the embodiments of this application, when configured with M DL SPSs, a terminal can determine, based on at least one of first HARQ-ACK feedback indication information, first TDD configuration information, or first dynamic slot format information, a HARQ-ACK codebook corresponding to the M DL SPS configurations, and can further transmit the HARQ-ACK codebook, thereby improving communication effectiveness.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are used interchangeably in appropriate circumstances so that the embodiments of this application can be implemented in other orders than the order illustrated or described herein. In addition, objects distinguish by "first" and "second" are usually of a same type, and the number of such objects are not limited. For example, a first object may be one object or a plurality of objects. In addition, in this specification and claims, "and/or" represents at least one of connected objects, and the character "/" generally represents an "or" relationship between the associated objects.

It should be noted that the technologies described in the embodiments of this application are not limited to long term evolution (LTE)/LTE-Advanced (LTE-A) systems, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably in the embodiments of this application. The technologies described may be used in the above-mentioned systems and radio technologies as well as other systems and radio technologies. However, in the following descriptions, a new radio (NR) system is described for an illustration purpose, NR terms are used in most of the following descriptions, and these technologies may also be applied to other applications than an NR system application, for example, a 6th generation (6G) communication system.

Figures 1, 2:
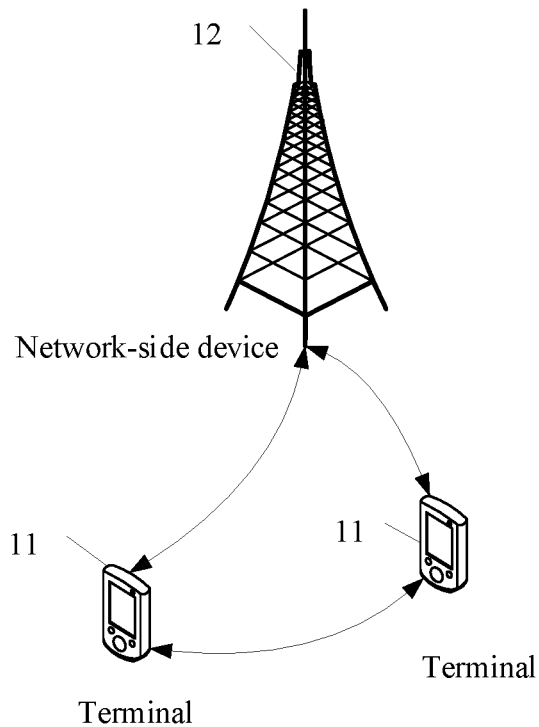
FIG. 1 is a block diagram of a wireless communication system according to an embodiment of this application.
FIG. 2 is a schematic flowchart of a HARQ-ACK feedback method according to an embodiment of this application.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile internet device (MID), a wearable device, or vehicle user equipment (VUE), or pedestrian user equipment (PUE). The wearable device includes a bracelet, a headset, a pair of glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a next generation NodeB (gNB), a home NodeB, a home evolved NodeB, a WLAN access point, a Wi-Fi node, a transmitting receiving point (TRP), or another appropriate term in the art. Provided that a same technical effect is achieved, the base station is not limited to any specific technical term. It should be noted that in the embodiments of this application, the base station in the NR system is merely used as an example, and a specific type of the base station is not limited.

The following specifically describes, through specific embodiments and application scenarios thereof with reference to the accompanying drawings, the hybrid automatic repeat request-acknowledgement (HARQ-ACK) feedback method and apparatus provided in the embodiments of this application.

As shown in FIG. 2, an embodiment of this application provides a HARQ-ACK feedback method 200. The method may be performed by a terminal. In other words, the method may be performed by software or hardware installed on the terminal. The method includes the following step.

S202. Determine, based on first information, a HARQ-ACK codebook corresponding to M downlink (DL) semi-persistent scheduling (SPS) configurations; where the first information includes at least one of the following: first HARQ-ACK feedback indication information, first time division duplexing (TDD) configuration information, or first dynamic slot format information; and $M \geq 1$, and M is an integer.

The first information may be obtained based on received radio resource control (RRC) signaling or downlink control information (DCI) signaling, where the DCI includes downlink grant (DL grant) for scheduled or unscheduled data and uplink grant (UL grant) for scheduled or unscheduled data.

Optionally, before S202, the terminal may further receive RRC signaling or DCI signaling, and obtain the first information based on the received RRC signaling or DCI signaling.

In an implementation, the M DL SPS configurations in this embodiment are all DL SPS configurations currently activated on the terminal; or in another implementation, the M DL SPS configurations are all DL SPS configurations configured for the terminal by a network.

The first HARQ-ACK feedback indication information in this embodiment may be used to indicate a time domain position (for example, a slot A), and this time domain position may be used for determining the HARQ-ACK codebook corresponding to the M DL SPS configurations. Further, the M DL SPS configurations correspond to W priorities, where $1 \leq W \leq M$, and W is an integer. The first HARQ-ACK feedback indication information in this embodiment may be used to indicate a time domain position (for example, a slot A1), and this time domain position may be used for determining a HARQ-ACK codebook corresponding to a DL SPS configuration of a specified priority in the M DL SPS configurations, where the specified priority is one or more priorities or a group of priorities in the W priorities. Optionally, the specified priority may be a priority configured or indicated by a network.

Further, a time domain position (for example, a slot A) indicated by the first HARQ-ACK feedback indication information in this embodiment may be further used for: determining a HARQ-ACK codebook corresponding to a DL SPS configuration j in the MDL SPS configurations, where j is a number or an identifier of one or more DL SPS configurations; and determining a HARQ-ACK codebook corresponding to one group of DL SPS configurations in the M DL SPS configurations.

It should be noted that a priority corresponding to a DL SPS configuration mentioned in the embodiments of this application may be a priority corresponding to an SPS physical downlink shared channel (PDSCH) for the DL SPS configuration, or may be a priority of HARQ-ACK corresponding to the SPS PDSCH for the DL SPS configuration, or may be a priority of a HARQ-ACK codebook corresponding to the SPS PDSCH for the DL SPS configuration.

The first TDD configuration information in this embodiment may be used to indicate a time domain position (for example, a slot A2), and this time domain position may be used for determining the HARQ-ACK codebook corresponding to the M DL SPS configurations, or may be further used for: determining a HARQ-ACK codebook corresponding to a DL SPS configuration j in the M DL SPS configurations, where j is a number or an identifier of one or more DL SPS configurations; determining a HARQ-ACK codebook corresponding to one group of DL SPS configurations in the M DL SPS configurations; and determining a HARQ-ACK codebook corresponding to the M DL SPS configurations that correspond to W priorities, where 1≤W≤M, and W is an integer. The first HARQ-ACK feedback indication information in this embodiment may be used to indicate a time domain position (for example, a slot A1), and this time domain position may be used for determining a HARQ-ACK codebook corresponding to a DL SPS configuration of a specified priority in the M DL SPS configurations, where the specified priority is one or more priorities or a group of priorities in the W priorities.

The first TDD configuration information may be cell-specific TDD configuration information, or may be UE-specific TDD configuration information.

The first dynamic slot format information in this embodiment may be determined based on a dynamic slot format indicator (SFI), where the dynamic SFI may make modifications to a transmission direction of flexible slot or symbol.

The first dynamic slot format information in this embodiment may be used to indicate a time domain position (for example, a slot A3), and this time domain position may be used for determining the HARQ-ACK codebook corresponding to the M DL SPS configurations, or may be further used for: determining a HARQ-ACK codebook corresponding to a DL SPS configuration j in the M DL SPS configurations, where j is a number or an identifier of one or more DL SPS configurations; determining a HARQ-ACK codebook corresponding to one group of DL SPS configurations in the M DL SPS configurations; and determining a HARQ-ACK codebook corresponding to the M DL SPS configurations that correspond to W priorities, where 1≤W≤M, and W is an integer. The first HARQ-ACK feedback indication information in this embodiment may be used to indicate a time domain position (for example, a slot A1), and this time domain position may be used for determining a HARQ-ACK codebook corresponding to a DL SPS configuration of a specified priority in the M DL SPS configurations, where the specified priority is one or more priorities or a group of priorities in the W priorities.

It should be noted that the determining a HARQ-ACK codebook corresponding to a DL SPS configuration mentioned in the embodiments of this application may specifically be: determining a HARQ-ACK codebook corresponding/related to an SPS physical downlink shared channel (PDSCH) for the DL SPS configuration.

In this embodiment, the terminal may determine, based on any one of the first HARQ-ACK feedback indication information, the first TDD configuration information, or the first dynamic slot format information, the HARQ-ACK codebook corresponding to the M DL SPS configurations. For example, the terminal may determine, based on a time domain resource indicated by the first HARQ-ACK feedback indication information, the HARQ-ACK codebook corresponding to the M DL SPS configurations. For another example, the terminal may determine, based on an uplink time domain resource indicated by the first TDD configuration information or the first dynamic slot format information, the HARQ-ACK codebook corresponding to the M DL SPS configurations.

In this embodiment, the terminal may determine, based on any two of the first HARQ-ACK feedback indication information, the first TDD configuration information, or the first dynamic slot format information, the HARQ-ACK codebook corresponding to the M DL SPS configurations. For example, the terminal may determine, based on a time domain resource indicated by the first HARQ-ACK feedback indication information in combination with an uplink time domain resource indicated by the first TDD configuration information or by the first dynamic slot format information, the HARQ-ACK codebook corresponding to the M DL SPS configurations. For another example, the terminal may determine, based on an uplink time domain resource indicated by the first TDD configuration information or the first dynamic slot format information, the HARQ-ACK codebook corresponding to the M DL SPS configurations; and this example is specifically, for example, a flexible slot indicated by the first TDD configuration information is modified to an uplink slot using the first dynamic slot format information, and the terminal determines, based on the uplink slot, the HARQ-ACK codebook corresponding to the M DL SPS configurations.

In this embodiment, the terminal may determine, based on the first HARQ-ACK feedback indication information, the first TDD configuration information, or the first dynamic slot format information, the HARQ-ACK codebook corresponding to the M DL SPS configurations. For example, a flexible slot indicated by the first TDD configuration information is modified to an uplink slot using the first dynamic slot format information, and the terminal may determine, based on a time domain resource (for example, a slot, and the slot may be the modified uplink slot) indicated by the first HARQ-ACK feedback indication information, the HARQ-ACK codebook corresponding to the M DL SPS configurations.

According to the HARQ-ACK feedback method provided in this embodiment of this application, when configured with M DL SPSs, the terminal can determine, based on at least one of the first HARQ-ACK feedback indication information, the first TDD configuration information, and the first dynamic slot format information, the HARQ-ACK codebook corresponding to M DL SPS configurations, and can further transmit the HARQ-ACK codebook, thereby improving communication effectiveness.

Optionally, the embodiment 200 may further include the following step: determining, based on the first information, a time domain resource used for transmitting the HARQ-ACK codebook.

The first information in this embodiment may be the same as or different from the first information for determining a HARQ-ACK codebook in embodiment 200. The "different" mentioned herein may specifically means that information types are different and/or information content is different. That information types are different mentioned herein means, for example, that the first HARQ-ACK feedback indication information and the first TDD configuration information may be referred to as two different types of information. That information content is different mentioned herein means, for example, that one piece of first TDD configuration information indicates a first slot format, and another piece of first TDD configuration information indicates a second slot format, where the first slot format and the second slot format are different from each other, therefore, the one piece of first TDD configuration information and the another piece of first TDD configuration information may be referred to as being different in content.

Specifically, for example, in embodiment 200, the terminal determines, based on a first time domain resource indicated by the first HARQ-ACK feedback indication information, the HARQ-ACK codebook corresponding to the M DL SPS configurations. In this embodiment, the terminal determines, based on the first HARQ-ACK feedback indication information, the first time domain resource as a time domain resource for transmitting the HARQ-ACK codebook. In this case, the terminal may further transmit, by using the first time domain resource, the determined HARQ-ACK codebook.

For another example, in embodiment 200, the terminal determines, based on a first time domain resource indicated by the first HARQ-ACK feedback indication information, the HARQ-ACK codebook corresponding to the M DL SPS configurations. The first time domain resource collides with a downlink time domain resource indicated by the first TDD configuration information or the first dynamic slot format information. In this case, the terminal in this embodiment may determine, based on the first TDD configuration information or the first dynamic slot format information, a second time domain resource for transmitting the HARQ-ACK codebook. In this way, the terminal may further transmit, by using the second time domain resource, the determined HARQ-ACK codebook, where the determined HARQ-ACK codebook may be determined based on the first time domain resource, or may be determined based on the second time domain resource.

For still another example, in embodiment 200, the terminal determines, based on a third time domain resource indicated by the first TDD configuration information, the HARQ-ACK codebook corresponding to the M DL SPS configurations. In this embodiment, the terminal may determine, based on the first dynamic slot format information, a fourth time domain resource for transmitting the HARQ-ACK codebook. In this case, the terminal may further transmit, by using the fourth time domain resource, the determined HARQ-ACK codebook, where the determined HARQ-ACK codebook may be determined based on the third time domain resource, or may be determined based on the fourth time domain resource.

In the foregoing embodiment, after the determining, based on the first information, a time domain resource used for transmitting the HARQ-ACK codebook, the method may further include the following step: determining, based on second information, whether to transmit the HARQ-ACK codebook on the time domain resource; where the second information includes at least one of the following: second HARQ-ACK feedback indication information, second TDD configuration information, second dynamic slot format information, uplink or downlink grant indication information, and a listen before talk (LBT) monitoring result of an unlicensed band.

Optionally, the determining, based on second information, whether to transmit the HARQ-ACK codebook on the time domain resource includes: in a case that the time domain resource determined based on the first information collides with a downlink time domain resource indicated by the second information, or that the second information indicates that the time domain resource is unavailable (for example, the LBT fails), skipping transmitting the HARQ-ACK codebook on the time domain resource determined based on the first information or discarding transmission of the HARQ-ACK codebook.

Optionally, the determining, based on second information, whether to transmit the HARQ-ACK codebook on the time domain resource includes: in a case that the time domain resource determined based on the first information partially or completely overlaps an uplink time domain resource indicated by the second information, transmitting the HARQ-ACK codebook on the time domain resource.

Optionally, the determining, based on first information, a HARQ-ACK codebook corresponding to M downlink semi-persistent scheduling DL SPS configurations in the foregoing embodiments includes one of the following:

(1) determining, based on a time domain resource indicated by the first HARQ-ACK feedback indication information, the HARQ-ACK codebook corresponding to the M DL SPS configurations; or (2) determining, based on a time domain resource indicated by the first HARQ-ACK feedback indication information, a HARQ-ACK codebook corresponding to M1 ones of the DL SPS configurations, where $1 \leq M1 < M$, and M1 is an integer.

In this embodiment, in a case that the time domain resource indicated by the first HARQ-ACK feedback indication information collides with a downlink resource, no HARQ-ACK codebook is generated based on the time domain resource indicated by the first HARQ-ACK feedback indication information. The downlink resource may be indicated by the first TDD configuration information or the first dynamic slot format information, or may be indicated or configured by information other than the first TDD configuration information and the first dynamic slot format information.

Optionally, the M DL SPS configurations correspond to W priorities, where $1 \leq W \leq M$, and W is an integer.

Optionally, the M DL SPS configurations correspond to W priorities, where $1 \leq W \leq M$, and W is an integer; and the M1 DL SPS configurations correspond to a first priority, where the first priority is one of the W priorities. For example, the first priority is the highest or lowest priority in the W priorities, or a priority configured by a network.

Optionally, the first HARQ-ACK feedback indication information corresponds to L priorities, where $L \geq 1$, and L is an integer. In actual application, L may be greater than, less than or equal to W.

It should be noted that the forgoing three options may be all satisfied, or only one or two of them are satisfied.

In order to describe in detail the foregoing embodiment, the following provides description by illustrating seven specific implementations.

Implementation 1: The M DL SPS configurations correspond to one priority (for example, a high priority or a low priority), and the HARQ-ACK codebook corresponding to the M DL SPS configurations is determined based on a time domain resource indicated by the first HARQ-ACK feedback indication information.

Implementation 2: The M DL SPS configurations correspond to two priorities (for example, a high priority and a low priority), and the HARQ-ACK codebook corresponding to the M DL SPS configurations is determined based on a time domain resource indicated by the first HARQ-ACK feedback indication information.

Implementation 3: The M DL SPS configurations correspond to two priorities (for example, a high priority and a low priority), and a HARQ-ACK codebook corresponding to M1 DL SPS configurations is determined based on a time domain resource indicated by the first HARQ-ACK feedback indication information, where the M1 DL SPS configurations correspond to a high priority or a low priority, and M1≤M.

Implementation 4: The M DL SPS configurations correspond to one priority (for example, a high priority or a low priority), the first HARQ-ACK feedback indication information corresponds to L priorities, where L=1, and the HARQ-ACK codebook corresponding to the M DL SPS configurations is determined based on a time domain resource indicated by the first HARQ-ACK feedback indication information.

Implementation 5: The MDL SPS configurations correspond to one priority (for example, a high priority or a low priority), the first HARQ-ACK feedback indication information corresponds to L priorities, where L=2 (for example, a high priority and a low priority), and the HARQ-ACK codebook corresponding to the M DL SPS configurations is determined based on a time domain resource indicated by the first HARQ-ACK feedback indication information.

Implementation 6: The M DL SPS configurations correspond to two priorities (for example, a high priority and a low priority), the first HARQ-ACK feedback indication information corresponds to L priorities, where L=1 (for example, a high priority or a low priority), and a HARQ-ACK codebook corresponding to M1 DL SPS configurations is determined based on a time domain resource indicated by the first HARQ-ACK feedback indication information, where the M1 DL SPS configurations correspond to L priorities (high priorities or low priorities), and M1≤M.

Implementation 7: The M DL SPS configurations correspond to two priorities (for example, a high priority and a low priority), the first HARQ-ACK feedback indication information corresponds to L priorities, where L=2 (for example, a high priority and a low priority), and the HARQ-ACK codebook corresponding to the M DL SPS configurations is determined based on a time domain resource indicated by the first HARQ-ACK feedback indication information.

Optionally, the determining, based on first information, a HARQ-ACK codebook corresponding to M downlink semi-persistent scheduling DL SPS configurations in the foregoing embodiments may further include one of the following:

(1) determining, based on a time domain resource indicated by the first TDD configuration information or the first dynamic slot format information, the HARQ-ACK codebook corresponding to the M DL SPS configurations; or (2) determining, based on a time domain resource indicated by the first TDD configuration information or the first dynamic slot format information, a HARQ-ACK codebook corresponding to M1 ones of the DL SPS configurations, where 1≤M1<M, and M1 is an integer.

Optionally, the M DL SPS configurations correspond to W priorities, where 1≤W≤M, and W is an integer.

Optionally, the M DL SPS configurations correspond to W priorities, where 1≤W≤M, and W is an integer; and the M1 DL SPS configurations correspond to a first priority, where the first priority is one of the W priorities. For example, the first priority is the highest or lowest priority in the W priorities, or a priority configured by a network.

It should be noted that the forgoing two options may be both satisfied, or only one or two of them are satisfied. For a specific implementation of this embodiment, reference may be made to the above illustrated seven implementations. In specific application, the first HARQ-ACK feedback indication information in the above seven implementations may be replaced with the first TDD configuration information or the first dynamic slot format information.

Optionally, the determining, based on first information, a HARQ-ACK codebook corresponding to M downlink semi-persistent scheduling DL SPS configurations in the foregoing embodiments includes one of the following:

(1) determining, based on a time domain resource indicated by the first information, a HARQ-ACK codebook corresponding to a DL SPS configuration j in the M DL SPS configurations, where specifically, in this embodiment, the HARQ-ACK codebook corresponding to the DL SPS configuration j may be determined based on the time domain resource indicated by the first information and a HARQ-ACK feedback timing corresponding to the DL SPS configuration j, and for a relationship between the DL SPS configuration j and the first information, for example, the first information is indicated by each DL SPS configuration j; or (2) determining, based on a time domain resource indicated by the first information, a HARQ-ACK codebook corresponding to one group of DL SPS configurations in the M DL SPS configurations. Specifically, in this embodiment, the HARQ-ACK codebook corresponding to the one group of DL SPS configurations may be determined based on the time domain resource indicated by the first information and a HARQ-ACK feedback timing set corresponding to the one group of DL SPS configurations.

Optionally, the first information in this embodiment may be the first HARQ-ACK feedback indication information, and the first HARQ-ACK feedback indication information corresponds to a plurality of the DL SPS configurations. Specifically, for example, the first HARQ-ACK feedback indication information is applicable to DL SPS configurations of L priorities, where L may be greater than or equal to 1, and a relationship between L and W may not be limited. For example, L may be greater than, equal to, or less than W. In this embodiment, for example, the first HARQ-ACK feedback indication information indicates one resource, and this resource may be used for determining a HARQ-ACK codebook corresponding to the DL SPS configurations of L priorities.

Optionally, as mentioned in embodiment 200, the M DL SPS configurations correspond to W priorities, one HARQ-ACK codebook is generated for the M DL SPS configurations, and the one HARQ-ACK codebook includes HARQ-ACK information corresponding to the M DL SPS configurations.

Optionally, as mentioned in embodiment 200, the M DL SPS configurations correspond to W priorities, a maximum of W HARQ-ACK codebooks are generated for the M DL SPS configurations, and any one of the HARQ-ACK codebooks includes HARQ-ACK information for a DL SPS configuration corresponding to a priority of the any one of the HARQ-ACK codebooks, where 1≤W≤M, and W is an integer.

In order to describe in detail the HARQ-ACK codebook mentioned in the foregoing embodiments, the following provides description with reference to several specific implementations.

Implementation 1: The HARQ-ACK codebook includes HARQ-ACK information, the HARQ-ACK information corresponds to a first SPS physical downlink shared channel PDSCH reception occasion between a time domain resource N0 and a time domain resource N1, and the first SPS PDSCH reception occasion corresponds to the M DL SPS configurations.

Implementation 2: The HARQ-ACK codebook includes HARQ-ACK information of a first priority (equivalent to the specified priority mentioned in the foregoing embodiment 200), the HARQ-ACK information of the first priority corresponds to a second SPS PDSCH reception occasion between the time domain resource N0 and the time domain resource N1, and the second SPS PDSCH reception occasion corresponds to a DL SPS configuration corresponding to the first priority in the M DL SPS configurations.

Implementation 3: The HARQ-ACK codebook includes HARQ-ACK information of a first priority set, the HARQ-ACK information of the first priority set corresponds to a third SPS PDSCH reception occasion between the time domain resource N0 and the time domain resource N1, and the third SPS PDSCH reception occasion corresponds to a DL SPS configuration corresponding to the first priority set in the M DL SPS configurations, where the first priority set may be part or all of the W priorities mentioned in the foregoing embodiments.

Implementation 4: The HARQ-ACK codebook includes HARQ-ACK information for a first DL SPS configuration, the HARQ-ACK information for the first DL SPS configuration corresponds to a fourth SPS PDSCH reception occasion between the time domain resource N0 and the time domain resource N1, and the fourth SPS PDSCH reception occasion corresponds to the first DL SPS configuration in the M DL SPS configurations.

Implementation 5: The HARQ-ACK codebook includes HARQ-ACK information for a first DL SPS configuration set, the HARQ-ACK information for the first DL SPS configuration set corresponds to a fifth SPS PDSCH reception occasion between the time domain resource N0 and the time domain resource N1, and the fifth SPS PDSCH reception occasion corresponds to the first DL SPS configuration set in the M DL SPS configurations. The first DL SPS configuration set mentioned herein may be specifically the one group of DL SPS configurations mentioned in the foregoing embodiments.

The time domain resource N0 and the time domain resource N1 mentioned in the above Implementation 1 to Implementation 5 may be time domain resources for generating any HARQ-ACK codebook. Optionally, the time domain resource N0 and the time domain resource N1 may alternatively be determined based on at least one of the following: the first information, a DL SPS configuration, and activation DCI for a DL SPS configuration.

For the HARQ-ACK codebook mentioned in the above Implementation 1 to Implementation 5, optionally, SPS HARQ-ACK information whose priority=p and/or number is j included in the HARQ-ACK codebook corresponds to an SPS PDSCH reception occasion whose priority=p and/or number is j between the time domain resource N0 and the time domain resource N1.

Optionally, for the HARQ-ACK codebook mentioned in the foregoing embodiments, HARQ-ACK information included in the HARQ-ACK codebook corresponds to an SPS PDSCH reception occasion previous to slot (N-K) (including slot N-K), where slot N herein is a time domain position used for generating a HARQ-ACK codebook. A time domain position being a slot is used as an example for description in this embodiment.

Optionally, K is one value, K=min$\{K_{1,j,p}\}$ or max$\{K_{1,j,p}\}$, j is a number of a DL SPS configuration, j may be one of the M DL SPS configurations, p is a number of a priority, and $K_{1,j,p}$ is a HARQ-ACK feedback timing corresponding to a DL SPS configuration whose priority=p and number is j.

Optionally, K may be a plurality of values, $K_i=K_{1,j,p}$, and i=0–(j×p−1). For interpretation of the parameters herein, for example, j and p, refer to the foregoing description.

Optionally, for the HARQ-ACK codebook mentioned in the foregoing embodiments, SPS HARQ-ACK information whose priority=p and/or number is j included in the HARQ-ACK codebook corresponds to an SPS PDSCH reception occasion whose priority=p and/or number is j between slot (N−K0) and slot (N−K), where K0 may be a maximum value in a PDSCH-to-HARQ-ACK feedback timing set.

Optionally, for the HARQ-ACK codebook mentioned in the foregoing embodiments, SPS HARQ-ACK information whose priority=p and/or number is j included in the HARQ-ACK codebook corresponds to an SPS PDSCH reception occasion whose priority=p and/or number is j between slot (N0-K) and slot (N-K). N0 in this embodiment is a latest time domain position for generating a HARQ-ACK codebook corresponding to an SPS whose priority=p and/or number is j previous to a time domain position slot N used for generating a HARQ-ACK codebook corresponding to the SPS whose priority=p and/or number is j.

N and N0 mentioned in this embodiment may be configured by a network, for example, being configured when feedback indication information is configured; or may be indicated by network signaling, for example, being indicated when a feedback resource is indicated or triggered; or may be implicitly obtained through other configuration information, for example, being a maximum value in K1 set; or may be K1 configured by all SPS configurations.

For the above Implementation 1 to Implementation 5, optionally, there is no other time domain resource for generating a HARQ-ACK codebook between the time domain resource N0 and the time domain resource N1.

For the above Implementation 1 to Implementation 5, optionally, there is another time domain resource for generating a HARQ-ACK codebook between the time domain resource N0 and the time domain resource N1, and there is an untransmitted HARQ-ACK codebook on the another time domain resource for generating a HARQ-ACK codebook.

Optionally, the HARQ-ACK codebook mentioned in the foregoing embodiments includes HARQ-ACK information, and the method further includes: in a case that there is no SPS PDSCH transmission in all SPS PDSCH reception occasions corresponding to the HARQ-ACK information, skipping feeding back the HARQ-ACK codebook.

Optionally, the HARQ-ACK codebook mentioned in the foregoing embodiments includes HARQ-ACK information, and the method further includes: in a case that there is no SPS PDSCH transmission in some of SPS PDSCH reception occasions corresponding to the HARQ-ACK information, skipping feeding back, in the HARQ-ACK codebook, target HARQ-ACK information, where the target HARQ-ACK information corresponds to the SPS PDSCH reception occasions with no SPS PDSCH transmission.

Optionally, for the HARQ-ACK codebook mentioned in the foregoing embodiments, the HARQ-ACK codebook determined at an N-th time domain position for generating a HARQ-ACK codebook includes one of the following two cases.

Case 1: Only HARQ-ACK information corresponding to SPS PDSCH used for generating a HARQ-ACK codebook after an (N−1)-th time domain position is included, that is, an untransmitted HARQ-ACK codebook is discarded instead of being retransmitted.

The N-th time domain position and the (N−1)-th time domain position in this embodiment both are time domain positions that are available for generating a HARQ-ACK codebook, and there is no other time domain position available for generating a HARQ-ACK codebook between the N-th time domain position and the (N−1)-th time domain position.

Case 2: HARQ-ACK information used for generating a HARQ-ACK codebook after an (N−X)-th time domain position is included, where the (N−X)-th time domain position is a latest time domain position at which the terminal transmits a HARQ-ACK codebook, and X is an integer greater than 1, that is, an untransmitted HARQ-ACK codebook is to be retransmitted at a next HARQ-ACK feedback moment.

In Case 2, optionally, a HARQ-ACK codebook corresponding to a first priority or all priorities generated at the N-th time domain position includes HARQ-ACK information corresponding to SPS PDSCH of a second priority or all priorities after the (N−X)-th time domain position, that is, an untransmitted HARQ-ACK codebook corresponding to the second priority or all priorities is to be retransmitted at a next HARQ-ACK feedback moment (for example, the N-th time domain position).

In order to describe in detail the HARQ-ACK feedback method provided in the embodiments of this application, the following provides description with reference to several specific embodiments. In the following embodiments, the terminal being UE is used as an example for description; and DL SPS is referred to as SPS for short, and SPS PDSCH of DL SPS is referred to as PDSCH for short.

Embodiment 1

Figure 3:
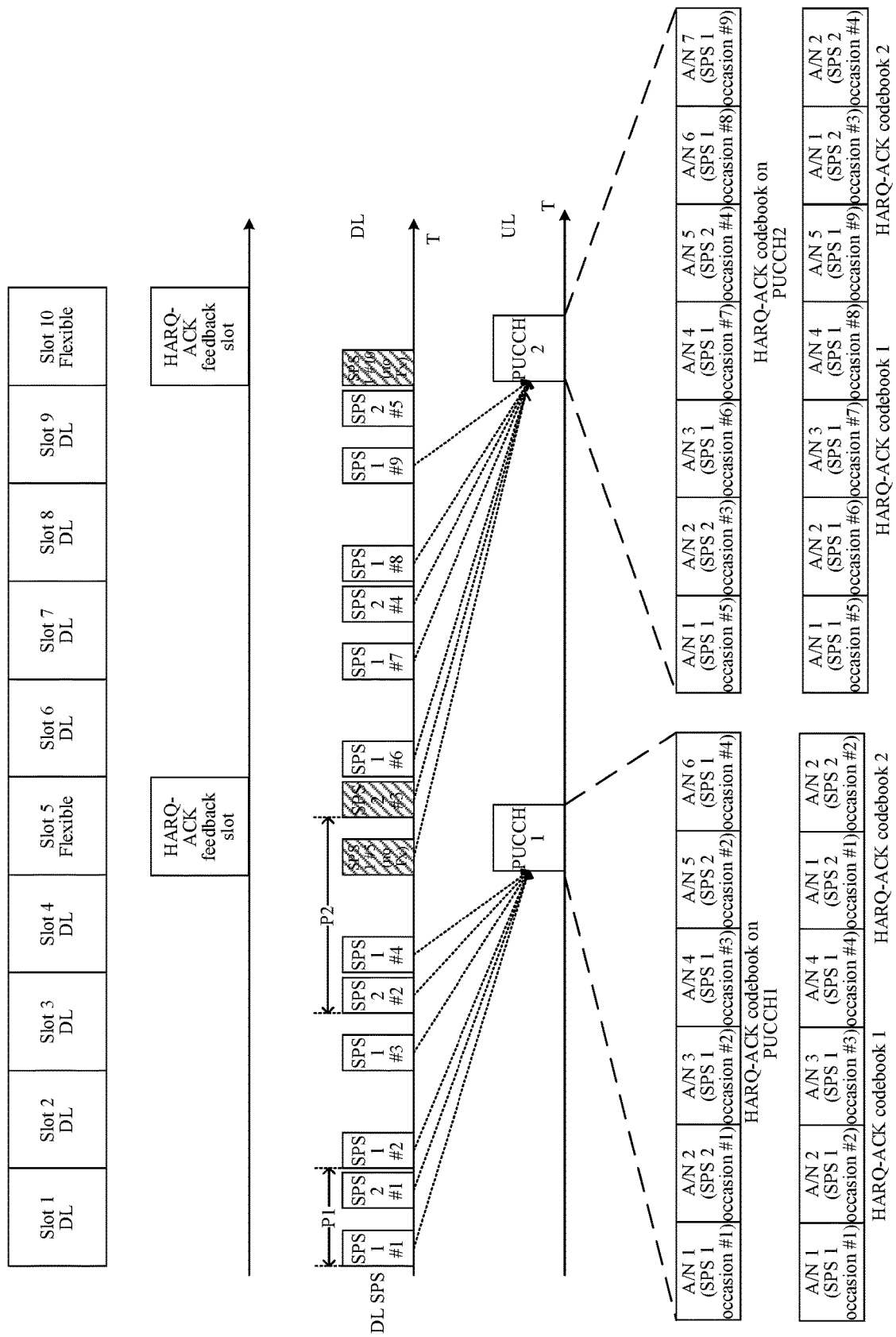
FIG. 3 is a schematic diagram of a process of generating a HARQ-ACK codebook according to an embodiment of this application.

Embodiment 1 is shown in FIG. 3.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in the top row in FIG. 3.

A network configures first HARQ-ACK feedback indication information for the UE for determining a HARQ-ACK codebook corresponding to all SPS configurations (including SPS 1 and SPS 2), which is, as shown in FIG. 3, slot 5 and slot 10.

The UE determines a HARQ-ACK codebook at slot 5. The HARQ-ACK codebook includes HARQ-ACK corresponding to SPS PDSCH of SPS 1 before slot ($5\text{-}K_{1,1}$) (including slot (5-K0), and includes HARQ-ACK corresponding to PDSCH of SPS 2 before slot ($5\text{-}K_{1,2}$) (including slot ($5\text{-}K_{1,2}$)).

In an implementation, PUCCH1 in FIG. 3 includes one HARQ-ACK codebook, and the HARQ-ACK codebook includes HARQ-ACKs corresponding to SPS PDSCH whose priority=1 and SPS PDSCH whose priority=2.

In this implementation, the HARQ-ACK codebook includes HARQ-ACK corresponding to PDSCH of an SPS whose priority=1 before slot ($5\text{-}K_{1,1}$) (including slot ($5\text{-}K_{1,1}$)), that is, the HARQ-ACK corresponding to the PDSCH of SPS 1, and includes HARQ-ACK corresponding to PDSCH of an SPS whose priority=2 before slot ($5\text{-}K_{1,2}$) (including slot ($5\text{-}K_{1,2}$)), that is, the HARQ-ACK corresponding to the PDSCH of SPS 2.

In another implementation, PUCCH1 (at slot 5) in FIG. 3 includes two HARQ-ACK codebooks, where a HARQ-ACK codebook 1 includes HARQ-ACK corresponding to SPS PDSCH whose priority=1, and a HARQ-ACK codebook 2 includes HARQ-ACK corresponding to SPS PDSCH whose priority=2.

In this implementation, the HARQ-ACK codebook 1 includes HARQ-ACK corresponding to PDSCH of an SPS whose priority=1 before slot ($5\text{-}K_{1,1}$) (including slot ($5\text{-}K_{1,1}$)), that is, the HARQ-ACK corresponding to the PDSCH of SPS 1; and the HARQ-ACK codebook 2 includes HARQ-ACK corresponding to PDSCH of an SPS whose priority=2 before slot ($5\text{-}K_{1,2}$) (including slot ($5\text{-}K_{1,2}$)), that is, the HARQ-ACK corresponding to the PDSCH of SPS 2.

The UE determines a HARQ-ACK codebook at slot 10. The HARQ-ACK codebook includes HARQ-ACK corresponding to PDSCH of SPS 1 between slot ($5\text{-}K_{1,1}$) (excluding slot ($5\text{-}K_{1,1}$)) and slot ($10\text{-}K_{1,1}$) (including slot ($10\text{-}K_{1,1}$)), and HARQ-ACK corresponding to PDSCH of SPS 2 between slot ($5\text{-}K_{1,2}$) (excluding slot ($5\text{-}K_{1,2}$)) and slot ($10\text{-}K_{1,2}$) (including slot ($10\text{-}K_{1,2}$)).

Because the HARQ-ACK corresponding to the SPS PDSCH before slot ($5\text{-}K_{1,1}$) (including slot ($5\text{-}K_{1,1}$)) is already included in the HARQ-ACK codebook generated at slot 5, the HARQ-ACK corresponding to the SPS PDSCH is no longer included in the HARQ-ACK codebook generated at slot 10.

It should be noted that SPS 1 PDSCH #5 and SPS 2 PDSCH #3 in this embodiment collide with a slot format, the network may not transmit the PDSCHs, and when a HARQ-ACK codebook is being generated in this embodiment, these SPS PDSCH reception occasions are included. In addition, in another implementation, in a case that the network does not transmit SPS PDSCH, when a HARQ-ACK codebook is being generated, these SPS PDSCH reception occasions may not be included.

In Embodiment 1, the UE may have the following behaviors.

UE behavior option 1: At slot 5, the UE generates a HARQ-ACK codebook 1 whose priority=1 and a HARQ-ACK codebook 2 whose priority=2 (it is assumed that priority=1 is a high priority, and priority=2 is a low priority), PUCCH1 carries the HARQ-ACK codebook 1, PUCCH2 carries the HARQ-ACK codebook 2, PUCCH1 and PUCCH2 do not overlap in terms of time, and therefore the UE transmits PUCCH1 and PUCCH2.

UE behavior option 2: At slot 5, the UE generates a HARQ-ACK codebook 1 whose priority=1 and a HARQ-ACK codebook 2 whose priority=2 (it is assumed that priority=1 is a high priority, and priority=2 is a low priority), PUCCH1 carries the HARQ-ACK codebook 1, PUCCH2 carries the HARQ-ACK codebook 2, PUCCH1 and PUCCH2 overlap in terms of time, and therefore the UE transmits PUCCH1 and discards PUCCH2.

UE behavior option 3: At slot 5, the UE generates a HARQ-ACK codebook 1 whose priority=1 and a HARQ-ACK codebook 2 whose priority=2 (it is assumed that priority=1 is a high priority, and priority=2 is a low priority), PUCCH1 carries the HARQ-ACK codebook 1 and the HARQ-ACK codebook 2, and the UE transmits PUCCH1.

UE behavior option 4: At slot 5, the UE generates a HARQ-ACK codebook 1 whose priority=1 and a HARQ-ACK codebook 2 whose priority=2 (it is assumed that priority=1 is a high priority, and priority=2 is a low priority), PUCCH1 carries the HARQ-ACK codebook 1, PUCCH2 carries the HARQ-ACK codebook 2, and in a case that PUCCH1 and PUCCH2 do not overlap, the UE separately transmits PUCCH1 and PUCCH2; or in a case that PUCCH1 and PUCCH2 overlap in time domain, the UE multiplexes the HARQ-ACK codebook 1 and the HARQ-ACK codebook 2 on one PUCCH for transmission.

Embodiment 2

Figure 4:
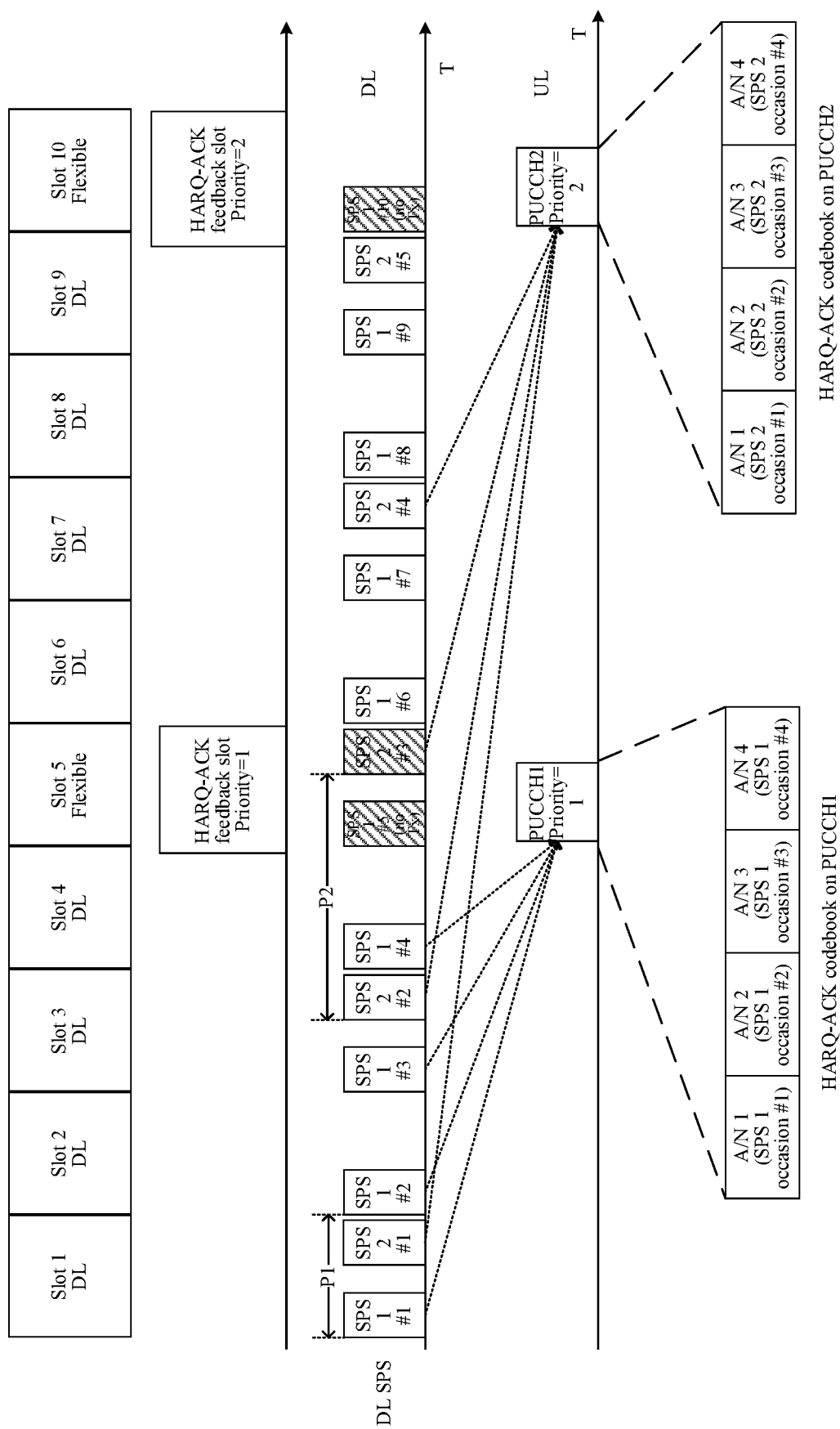
FIG. 4 is a schematic diagram of a process of generating a HARQ-ACK codebook according to an embodiment of this application.

Embodiment 2 is shown in FIG. 4.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in FIG. 4.

A network configures first HARQ-ACK feedback indication information for the UE for determining a HARQ-ACK codebook corresponding to an SPS configuration whose priority=1, which is, as shown in FIG. 4, slot 5; and the network configures second HARQ-ACK feedback indication information for determining a HARQ-ACK codebook corresponding to an SPS configuration whose priority=2, which is slot 10.

The UE determines a HARQ-ACK codebook at slot 5. The HARQ-ACK codebook includes HARQ-ACK corresponding to PDSCH of an SPS whose priority=1 before slot ($5-K_{1,1}$) (including slot ($5-K_{1,1}$)), that is, HARQ-ACK corresponding to PDSCH of SPS 1.

The UE determines a HARQ-ACK codebook at slot 10. The HARQ-ACK codebook includes HARQ-ACK corresponding to PDSCH of an SPS whose priority=2 before slot ($10-K_{1,2}$) (including slot ($10-K_{1,2}$)), that is, HARQ-ACK corresponding to PDSCH of SPS 2.

It should be noted that SPS 2 PDSCH #3 collides with a slot format, the network may not transmit the PDSCH, and when a HARQ-ACK codebook is being generated at slot 10 in this embodiment, these SPS PDSCH transmission occasions are included. In addition, in another implementation, in a case that the network does not transmit SPS PDSCH, when a HARQ-ACK codebook is being generated, these SPS PDSCH transmission occasions may not be included.

Embodiment 3

Figure 5:
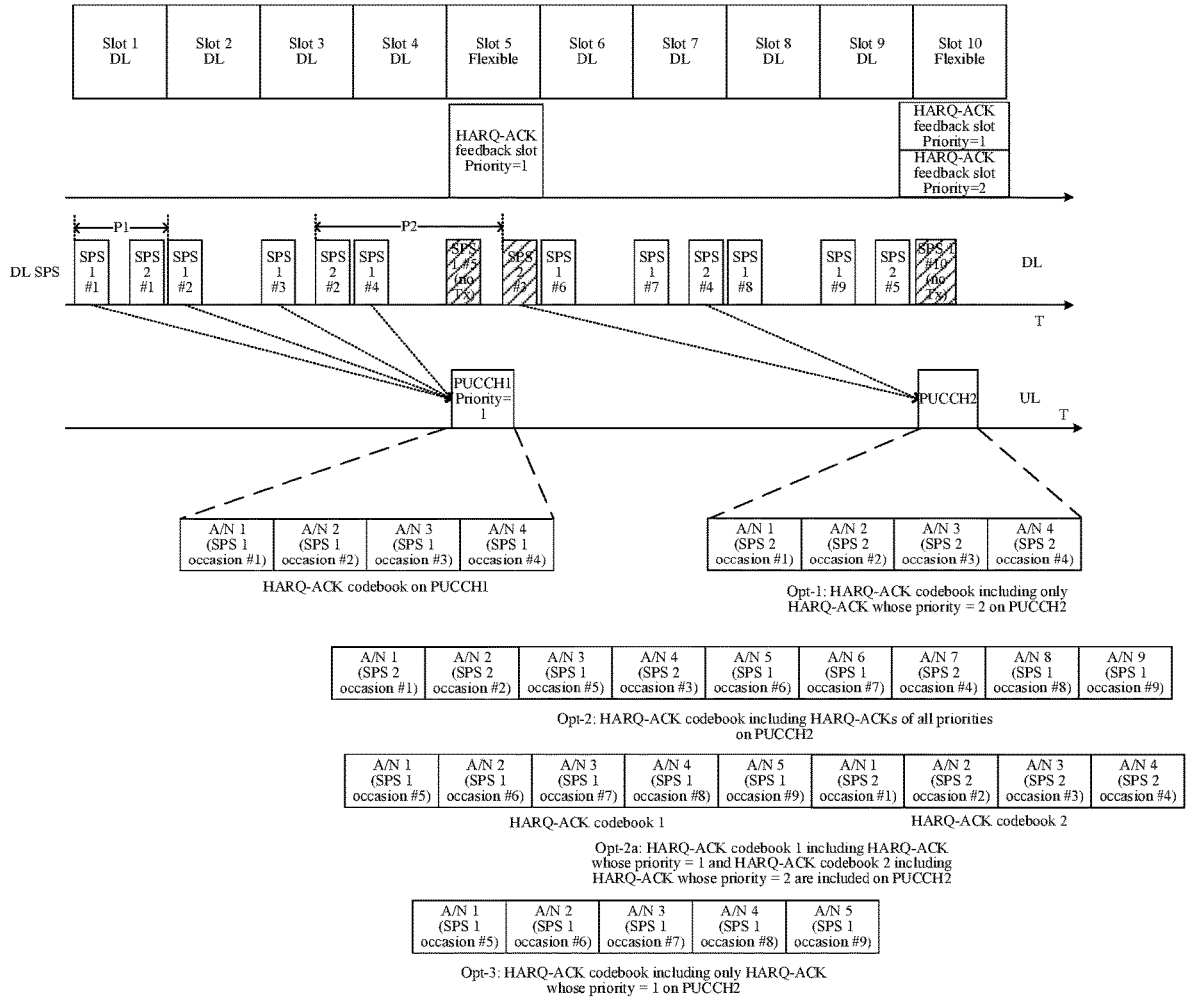
FIG. 5 is a schematic diagram of a process of generating a HARQ-ACK codebook according to an embodiment of this application.

Embodiment 3 is shown in FIG. 5.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in FIG. 5.

A network configures first HARQ-ACK feedback indication information for the UE for determining a HARQ-ACK codebook corresponding to an SPS configuration whose priority=1, which is, as shown in FIG. 5, slot 5 and slot 10; and the network configures second HARQ-ACK feedback indication information for determining a HARQ-ACK codebook corresponding to an SPS configuration whose priority=2, which is slot 10.

The UE determines a HARQ-ACK codebook at slot 5. The HARQ-ACK codebook includes HARQ-ACK corresponding to PDSCH of an SPS whose priority=1 before slot ($5-K_{1,1}$) (including slot ($5-K_{1,1}$)), that is, HARQ-ACK corresponding to PDSCH of SPS 1.

The UE determines a HARQ-ACK codebook at slot 10. Because a HARQ-ACK feedback time domain position corresponding to the SPS configuration whose priority=1 configured by the network collides with a HARQ-ACK feedback time domain position corresponding to the SPS configuration whose priority=2 configured by the network, the UE has several different behaviors.

Behavior option 1: PUCCH2 includes one HARQ-ACK codebook, and the HARQ-ACK codebook includes only HARQ-ACK corresponding to SPS PDSCH whose priority=2.

In this embodiment, the HARQ-ACK codebook includes HARQ-ACK corresponding to PDSCH of an SPS whose priority=2 before slot ($10-K_{1,2}$) (including slot ($10-K_{1,2}$)), that is, HARQ-ACK corresponding to PDSCH of SPS 2.

Behavior option 2: PUCCH2 includes one HARQ-ACK codebook, and the HARQ-ACK codebook includes HARQ-ACKs corresponding to SPS PDSCH whose priority=1 and SPS PDSCH whose priority=2.

In this embodiment, the HARQ-ACK codebook includes HARQ-ACK corresponding to PDSCH of an SPS whose priority=1 between slot ($5-K_{1,1}$) (excluding slot ($5-K_{1,1}$)) and slot ($10-K_{1,1}$) (including slot ($10-K_{1,1}$)), that is, HARQ-ACK corresponding to PDSCH of SPS 1, and includes HARQ-ACK corresponding to PDSCH of an SPS whose priority=2 before slot ($10-K_{1,2}$) (including slot ($10-K_{1,2}$)), that is, HARQ-ACK corresponding to PDSCH of SPS 2.

Behavior option 3: PUCCH2 includes two HARQ-ACK codebooks, where a HARQ-ACK codebook 1 includes HARQ-ACK corresponding to SPS PDSCH whose priority=1, and a HARQ-ACK codebook 2 includes HARQ-ACK corresponding to SPS PDSCH whose priority=2.

In this embodiment, the HARQ-ACK codebook 1 includes HARQ-ACK corresponding to PDSCH of an SPS whose priority=1 between slot ($5-K_{1,1}$) (excluding slot ($5-K_{1,1}$)) and slot ($10-K_{1,1}$) (including slot ($10-K_{1,1}$)), that is, HARQ-ACK corresponding to PDSCH of SPS 1; and the HARQ-ACK codebook 2 includes HARQ-ACK corresponding to PDSCH of an SPS whose priority=2 before slot ($10-K_{1,2}$) (including slot ($10-K_{1,2}$)), that is, HARQ-ACK corresponding to PDSCH of SPS 2.

Behavior option 4: PUCCH2 includes one HARQ-ACK codebook, and the HARQ-ACK codebook includes only HARQ-ACK corresponding to SPS PDSCH whose priority=1.

In this embodiment, the HARQ-ACK codebook includes HARQ-ACK corresponding to PDSCH of an SPS whose priority=1 between slot ($5-K_{1,1}$) (excluding slot ($5-K_{1,1}$))

and slot ($10\text{-}K_{1,1}$) (including slot ($10\text{-}K_{1,1}$)), that is, HARQ-ACK corresponding to PDSCH of SPS 1.

Embodiment 4

Figure 6:
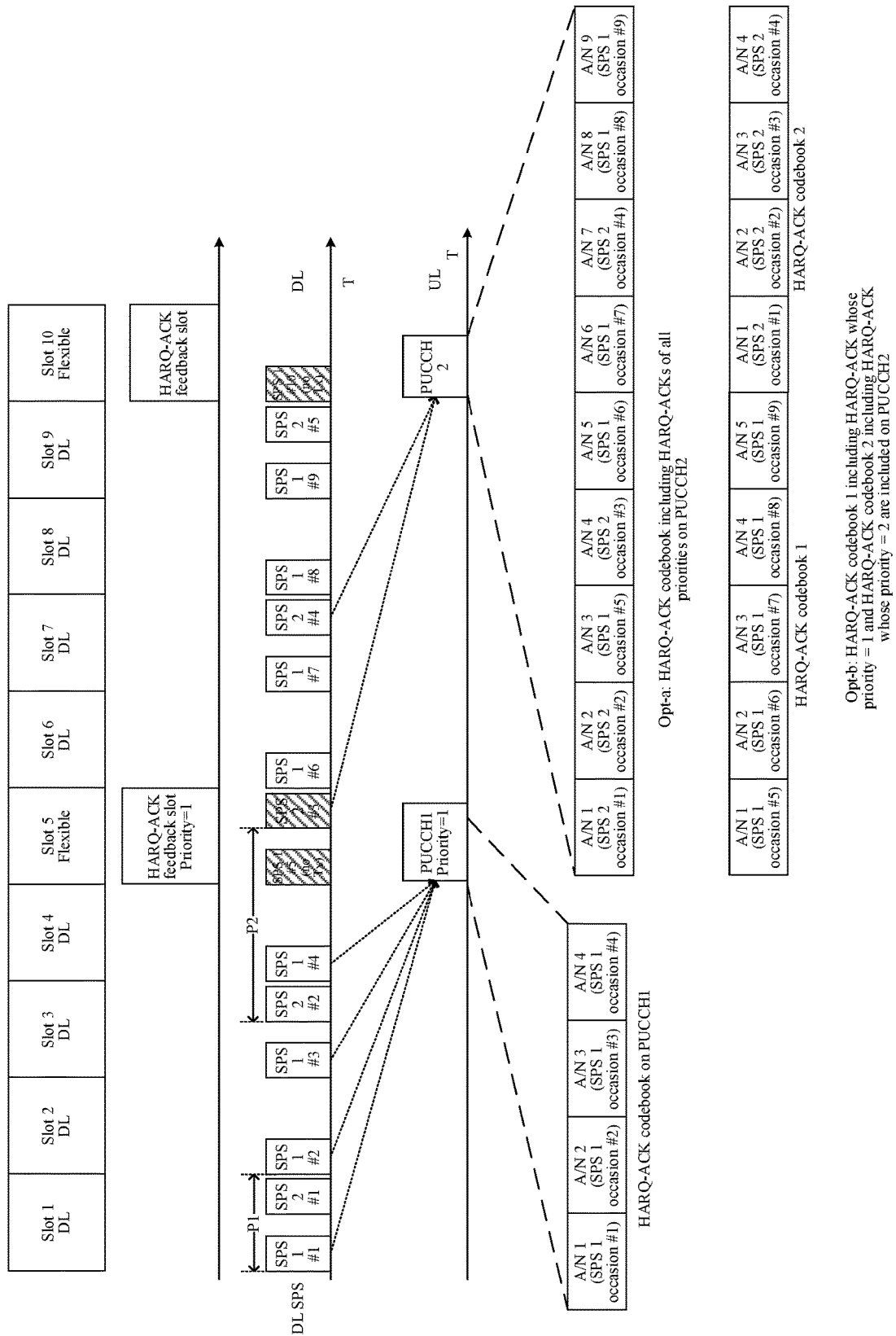
FIG. 6 is a schematic diagram of a process of generating a HARQ-ACK codebook according to an embodiment of this application.

Embodiment 4 is shown in FIG. 6.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in FIG. 6.

A network configures first HARQ-ACK feedback indication information for the UE for determining a HARQ-ACK codebook corresponding to an SPS configuration whose priority=1, which is, as shown in FIG. 6, slot 5 and slot 10; and the network configures second HARQ-ACK feedback indication information for determining a HARQ-ACK codebook corresponding to all SPS configurations, which is slot 10.

The UE determines a HARQ-ACK codebook at slot 5. The HARQ-ACK codebook includes HARQ-ACK corresponding to PDSCH of an SPS whose priority=1 before slot ($5\text{-}K_{1,1}$) (including slot ($5\text{-}K_{1,1}$)), that is, HARQ-ACK corresponding to PDSCH of SPS 1.

The UE determines a HARQ-ACK codebook at slot 10. Because slot 10 is configured by the network as a HARQ-ACK feedback time domain position corresponding to all SPS configurations, the UE has several different behaviors.

Behavior option 1: PUCCH2 includes one HARQ-ACK codebook, and the HARQ-ACK codebook includes HARQ-ACKs corresponding to SPS PDSCH whose priority=1 and SPS PDSCH whose priority=2.

In this embodiment, the HARQ-ACK codebook includes HARQ-ACK corresponding to PDSCH of an SPS whose priority=1 between slot ($5\text{-}K_{1,1}$) (excluding slot ($5\text{-}K_{1,1}$)) and slot ($10\text{-}K_{1,1}$) (including slot ($10\text{-}K_{1,1}$)), that is, HARQ-ACK corresponding to PDSCH of SPS 1, and includes HARQ-ACK corresponding to PDSCH of an SPS whose priority=2 before slot ($10\text{-}K_{1,2}$) (including slot ($10\text{-}K_{1,2}$)), that is, HARQ-ACK corresponding to PDSCH of SPS 2.

Behavior option 2: PUCCH2 includes two HARQ-ACK codebooks, where a HARQ-ACK codebook 1 includes HARQ-ACK corresponding to SPS PDSCH whose priority=1, and a HARQ-ACK codebook 2 includes HARQ-ACK corresponding to SPS PDSCH whose priority=2.

In this embodiment, the HARQ-ACK codebook 1 includes HARQ-ACK corresponding to PDSCH of an SPS whose priority=1 between slot ($5\text{-}K_{1,1}$) (excluding slot ($5\text{-}K_{1,1}$)) and slot ($10\text{-}K_{1,1}$) (including slot ($10\text{-}K_{1,1}$)), that is, HARQ-ACK corresponding to PDSCH of SPS 1; and the HARQ-ACK codebook 2 includes HARQ-ACK corresponding to PDSCH of an SPS whose priority=2 before slot ($10\text{-}K_{1,2}$) (including slot ($10\text{-}K_{1,2}$)), that is, HARQ-ACK corresponding to PDSCH of SPS 2.

Embodiment 5

Figure 7:
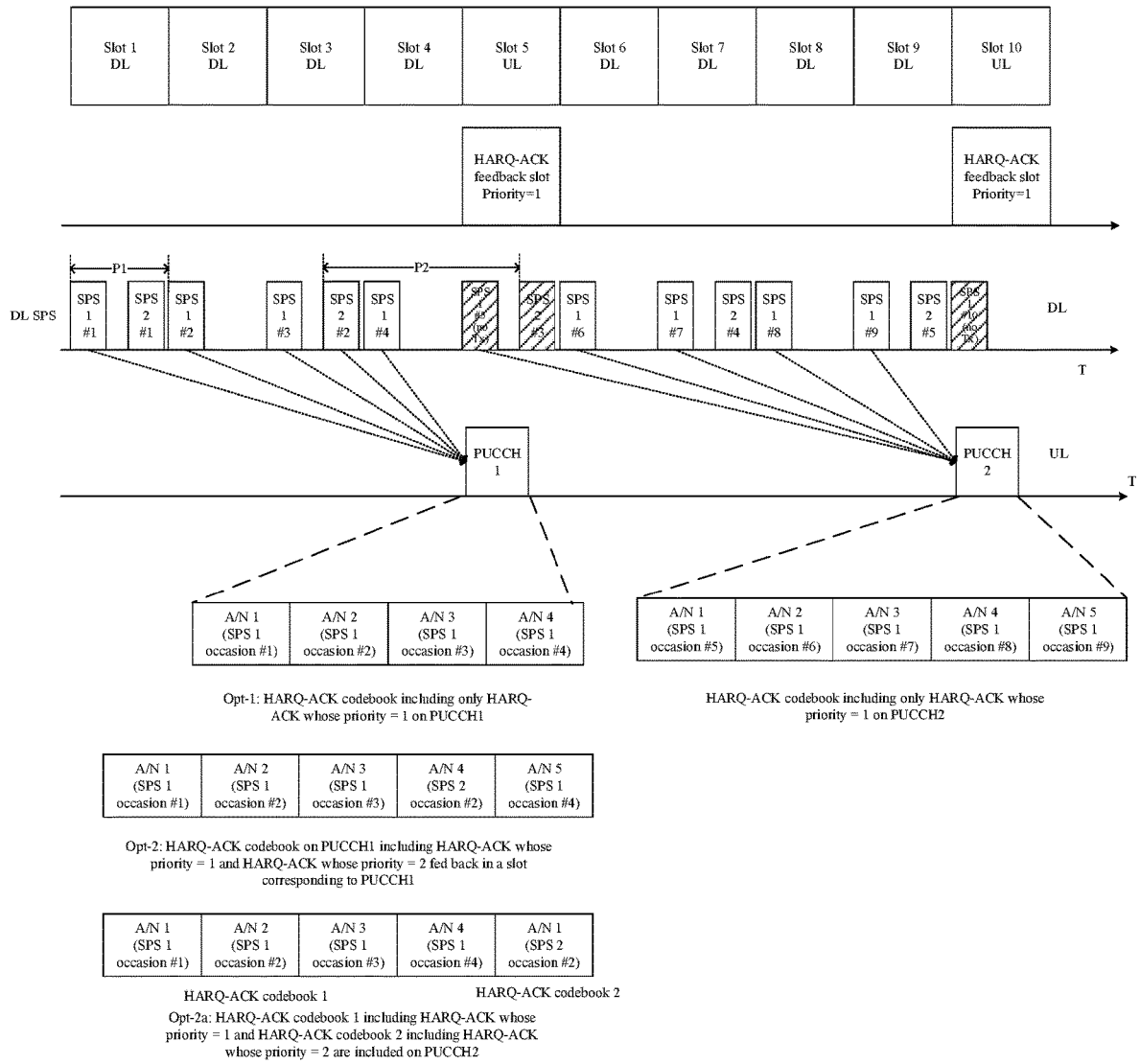
FIG. 7 is a schematic diagram of a process of generating a HARQ-ACK codebook according to an embodiment of this application.

Embodiment 5 is shown in FIG. 7.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in FIG. 7.

An UL resource indicated based on semi-persistent TDD configuration information is used to determine a HARQ-ACK codebook corresponding to an SPS configuration whose priority=1, which is, as shown in FIG. 7, slot 5 and slot 10.

The UE determines a HARQ-ACK codebook at slot 5. Because slot 5 is a feedback time domain position fed back in HARQ-ACK corresponding to an SPS configuration whose priority=1 and is also a feedback time domain position fed back in the HARQ-ACK corresponding to SPS 2 PDSCH #2 at slot 3, and for the HARQ-ACK corresponding to SPS 2, priority=2, the UE has the following different behaviors.

Behavior option 1: PUCCH2 includes one HARQ-ACK codebook, and the HARQ-ACK codebook includes only HARQ-ACK corresponding to SPS PDSCH whose priority=1.

In this embodiment, the HARQ-ACK codebook includes HARQ-ACK corresponding to PDSCH of an SPS whose priority=1 before slot ($5\text{-}K_{1,1}$) (including slot ($5\text{-}K_{1,1}$)), that is, HARQ-ACK corresponding to PDSCH of SPS 1.

Behavior option 2: PUCCH2 includes one HARQ-ACK codebook, and the HARQ-ACK codebook includes HARQ-ACKs corresponding to SPS PDSCH whose priority=1 and SPS PDSCH whose priority=2.

In this embodiment, the HARQ-ACK codebook includes HARQ-ACK corresponding to PDSCH of an SPS whose priority=1 before slot ($5\text{-}K_{1,1}$) (including slot ($5\text{-}K_{1,1}$)), that is, HARQ-ACK corresponding to PDSCH of SPS 1, and includes HARQ-ACK corresponding to PDSCH of an SPS whose priority=2 at slot ($5\text{-}K_{1,2}$), that is, HARQ-ACK corresponding to PDSCH #2 of SPS 2.

Behavior option 3: PUCCH2 includes two HARQ-ACK codebooks, where a HARQ-ACK codebook 1 includes HARQ-ACK corresponding to SPS PDSCH whose priority=1, and a HARQ-ACK codebook 2 includes HARQ-ACK corresponding to SPS PDSCH whose priority=2.

In this embodiment, the HARQ-ACK codebook 1 includes HARQ-ACK corresponding to PDSCH of an SPS whose priority=1 before slot ($5\text{-}K_{1,1}$) (including slot ($5\text{-}K_{1,1}$)), that is, HARQ-ACK corresponding to PDSCH of SPS 1; and the HARQ-ACK codebook 2 includes HARQ-ACK corresponding to PDSCH of an SPS whose priority=2 at slot ($5\text{-}K_{1,2}$), that is, HARQ-ACK corresponding to PDSCH #2 of SPS 2.

The UE determines a HARQ-ACK codebook at slot 10. Because slot 10 is a feedback time domain position fed back in HARQ-ACK corresponding to an SPS configuration whose priority=1 but is not a feedback time domain position fed back in the HARQ-ACK corresponding to the SPS 2 PDSCH, only the HARQ-ACK corresponding to PDSCH of the SPS whose priority=1 is included at slot 10.

Embodiment 6

Figure 8:
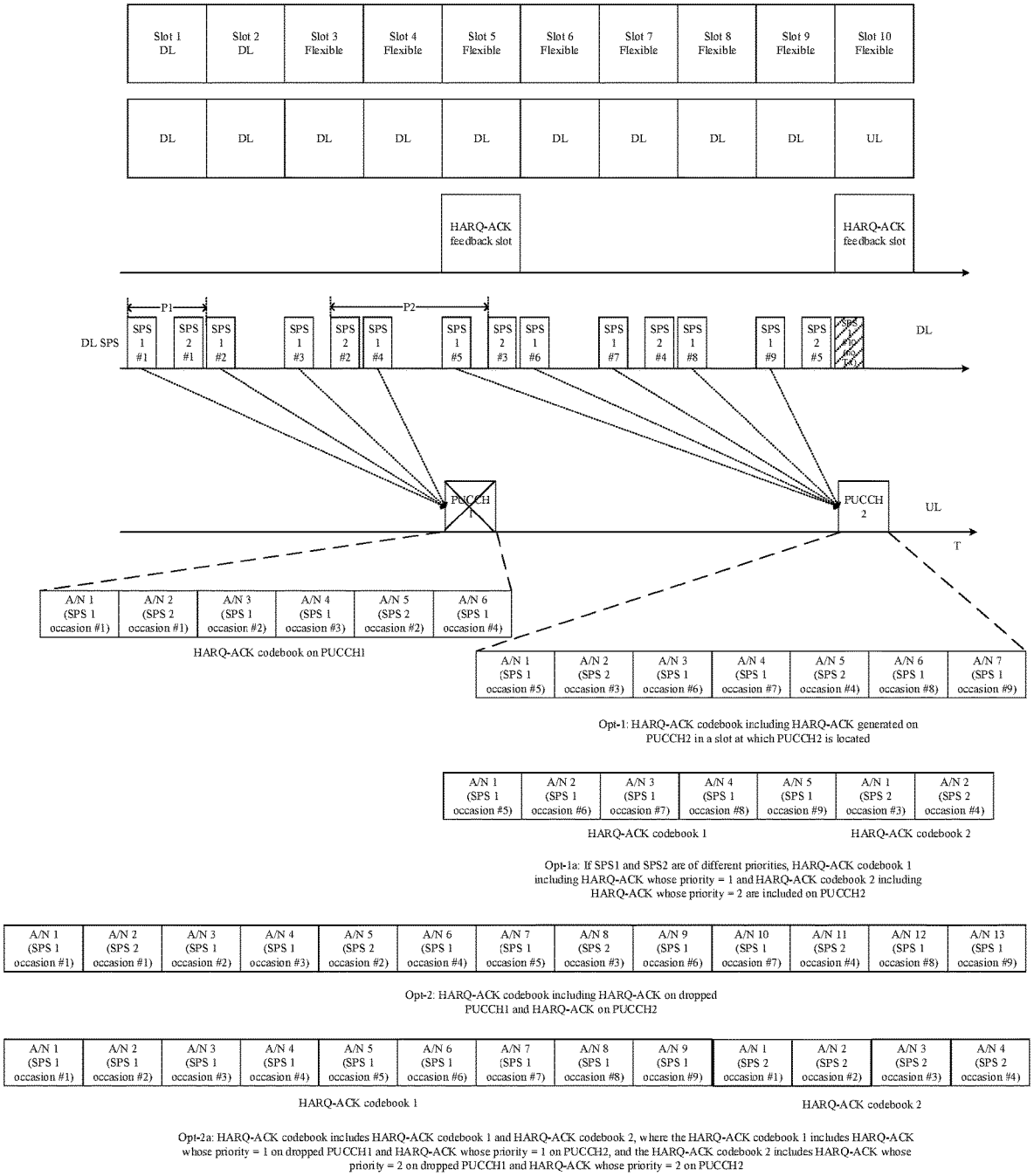
FIG. 8 is a schematic diagram of a process of generating a HARQ-ACK codebook according to an embodiment of this application.

Embodiment 6 is shown in FIG. 8.

UE is configured with SPS 1 and SPS 2, with periodicities of P1 and P2 respectively. A HARQ-ACK feedback timing $K_{1,1}$ of SPS 1=1, and a HARQ-ACK feedback timing $K_{1,2}$ of SPS 2=2.

A priority of SPS 1=1, and a priority of SPS 2=2; and it is assumed that priority=1 is a high priority, and priority=2 is a low priority.

The UE is configured with cell-specific TDD configuration information, indicating that a slot format is as shown in FIG. 8.

A network configures first HARQ-ACK feedback indication information for the UE for determining a HARQ-ACK codebook corresponding to all SPS configurations, which is, as shown in FIG. 8 slot 5 and slot 10.

The network indicates dynamic slot information to the UE by using an SFI, and the slot format indicated is as shown in FIG. 8.

Based on the first HARQ-ACK feedback indication information, the UE determines a HARQ-ACK codebook at slot 5. The HARQ-ACK codebook includes HARQ-ACK corresponding to PDSCH of SPS 1 before slot (5-$K_{1,1}$) (including slot (5-$K_{1,1}$)), and includes HARQ-ACK corresponding to PDSCH of SPS 2 before slot (5-$K_{1,2}$) (including slot (5-$K_{1,2}$)). Because slot 5 collides with the slot format indicated by the SFI, the UE does not transmit PUCCH1 that is at slot 5.

Based on the first HARQ-ACK feedback indication information, the UE determines a HARQ-ACK codebook at slot 10. Because the UE does not transmit HARQ-ACK at a generation moment of a previous HARQ-ACK codebook, the UE has different behaviors.

Behavior 1: PUCCH2 includes one HARQ-ACK codebook, and the HARQ-ACK codebook includes only HARQ-ACK corresponding to SPS PDSCH determined based on a time domain position currently fed back.

In this embodiment, the HARQ-ACK codebook includes HARQ-ACK corresponding to PDSCH of SPS 1 between slot (5-$K_{1,1}$) (excluding slot (5-$K_{1,1}$)) and slot (10-$K_{1,1}$) (including slot (10-$K_{1,1}$)), and HARQ-ACK corresponding to PDSCH of SPS 2 between slot (5-$K_{1,2}$) (excluding slot (5-$K_{1,2}$)) and slot (10-$K_{1,2}$) (including slot (10-$K_{1,2}$)).

Behavior option 2: PUCCH2 includes two HARQ-ACK codebooks, where a HARQ-ACK codebook 1 includes HARQ-ACK corresponding to SPS PDSCH whose priority=1 determined based on a time domain position currently fed back, and a HARQ-ACK codebook 2 includes HARQ-ACK corresponding to SPS PDSCH whose priority=2 determined based on the time domain position currently fed back.

In this embodiment, the HARQ-ACK codebook 1 includes HARQ-ACK corresponding to PDSCH of an SPS whose priority=1 between slot (5-$K_{1,1}$) (excluding slot (5-$K_{1,1}$)) and slot (10-$K_{1,1}$) (including slot (10-$K_{1,1}$)), that is, HARQ-ACK corresponding to PDSCH of SPS 1; and the HARQ-ACK codebook 2 includes HARQ-ACK corresponding to PDSCH of an SPS whose priority=2 between slot (5-$K_{1,2}$) (excluding slot (5-$K_{1,2}$)) and slot (10-$K_{1,2}$) (including slot (10-$K_{1,2}$)), that is, HARQ-ACK corresponding to PDSCH of SPS 2.

Behavior option 3: PUCCH2 includes one HARQ-ACK codebook, and the HARQ-ACK codebook includes only untransmitted HARQ-ACK corresponding to SPS PDSCH determined based on a time domain position previously fed back, and HARQ-ACK corresponding to SPS PDSCH determined based on a time domain position currently fed back.

In this embodiment, the HARQ-ACK codebook includes HARQ-ACK corresponding to PDSCH of an SPS whose priority=1 before slot (10-$K_{1,1}$) (including slot (10-$K_{1,1}$)), that is, HARQ-ACK corresponding to PDSCH of SPS 1, and includes HARQ-ACK corresponding to PDSCH of an SPS whose priority=2 before slot (10-$K_{1,2}$) (including slot (10-$K_{1,2}$)), that is, HARQ-ACK corresponding to PDSCH of SPS 2.

Behavior option 4: PUCCH2 includes two HARQ-ACK codebooks, where a HARQ-ACK codebook 1 includes untransmitted HARQ-ACK corresponding to SPS PDSCH whose priority=1 determined based on a time domain position previously fed back, and HARQ-ACK corresponding to SPS PDSCH whose priority=1 determined based on a time domain position currently fed back; and a HARQ-ACK codebook 2 includes untransmitted HARQ-ACK corresponding to SPS PDSCH whose priority=2 determined based on the time domain position previously fed back, and HARQ-ACK corresponding to SPS PDSCH whose priority=2 determined based on a time domain position currently fed back.

In this embodiment, the HARQ-ACK codebook 1 includes HARQ-ACK corresponding to PDSCH of an SPS whose priority=1 before slot (10-$K_{1,1}$) (including slot (10-$K_{1,1}$)), that is, HARQ-ACK corresponding to PDSCH of SPS 1; and the HARQ-ACK codebook 2 includes HARQ-ACK corresponding to PDSCH of an SPS whose priority=2 before slot (10-$K_{1,2}$) (including slot (10-$K_{1,2}$)), that is, HARQ-ACK corresponding to PDSCH of SPS 2.

Embodiment 7

It should be noted that the foregoing embodiments in this specification can be extended to scenarios in which HARQ-ACK cannot be sent due to LBT in unlicensed bands, such as a TDD or FDD scenario in an unlicensed band.

For an application embodiment of an unlicensed band (Embodiment 7), reference may be made to the foregoing Embodiment 6. In Embodiment 6, because slot 5 collides with the slot format indicated by the SFI, the UE does not transmit PUCCH1 at slot 5. In Embodiment 7, it is assumed that LBT at slot 5 fails, that is, slot 5 is unavailable, and other steps of Embodiment 7 are the same as those of Embodiment 6.

It should be noted that the HARQ-ACK feedback method provided in this embodiment of this application may be performed by a HARQ-ACK feedback apparatus or a control module for performing the HARQ-ACK feedback method in the HARQ-ACK feedback apparatus. This embodiment of this application uses the HARQ-ACK feedback apparatus performing the HARQ-ACK feedback method as an example to describe the HARQ-ACK feedback apparatus provided in the embodiments of this application.

Figure 9:
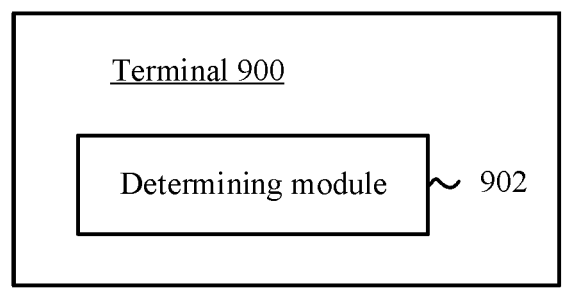
FIG. 9 is a schematic structural diagram of a HARQ-ACK feedback apparatus according to another embodiment of this application.

FIG. 9 is a schematic structural diagram of a HARQ-ACK feedback apparatus according to an embodiment of this application. The apparatus may correspond to a terminal in another embodiment. As shown in FIG. 9, the apparatus 900 includes:

a determining module 902, where the determining module 902 may be configured to determine, based on first information, a HARQ-ACK codebook corresponding to M DL SPS configurations; where the first information includes at least one of the following: first HARQ-ACK feedback indication information, first TDD configuration information, or first dynamic slot format information; and M≥1, and M is an integer.

The HARQ-ACK feedback apparatus provided in this embodiment of this application, when configured with MDL SPSs, can determine, based on at least one of first HARQ-ACK feedback indication information, first TDD configuration information, or first dynamic slot format information, a HARQ-ACK codebook corresponding to the M DL SPS configurations, and can further transmit the HARQ-ACK codebook, thereby improving communication effectiveness.

Optionally, in an embodiment, the determining module 902 is further configured to determine, based on the first information, a time domain resource used for transmitting the HARQ-ACK codebook.

Optionally, in an embodiment, the determining module 902 is configured to: determine, based on a time domain resource indicated by the first HARQ-ACK feedback indication information, the HARQ-ACK codebook corresponding to the M DL SPS configurations; or determine, based on a time domain resource indicated by the first HARQ-ACK feedback indication information, a HARQ-ACK codebook corresponding to M1 ones of the DL SPS configurations, where 1≤M1<M, and M1 is an integer.

Optionally, in an embodiment, the determining module 902 is further configured to: in a case that the time domain resource indicated by the first HARQ-ACK feedback indication information collides with a downlink resource, skip generating a HARQ-ACK codebook based on the time domain resource.

Optionally, in an embodiment, the determining module 902 is configured to: determine, based on a time domain resource indicated by the first TDD configuration information or by the first dynamic slot format information, the HARQ-ACK codebook corresponding to the M DL SPS configurations; or determine, based on a time domain resource indicated by the first TDD configuration information or by the first dynamic slot format information, a HARQ-ACK codebook corresponding to M1 ones of the DL SPS configurations, where 1≤M1<M, and M1 is an integer.

Optionally, in an embodiment, the M DL SPS configurations correspond to W priorities, where 1≤W≤M, and W is an integer; and/or the M1 DL SPS configurations correspond to a first priority, where the first priority is one of the W priorities; and/or the first HARQ-ACK feedback indication information corresponds to L priorities, where L≥1, and L is an integer.

Optionally, in an embodiment, the determining module 902 is configured to: determine, based on a time domain resource indicated by the first information, a HARQ-ACK codebook corresponding to a DL SPS configuration j in the M DL SPS configurations; or determine, based on a time domain resource indicated by the first information, a HARQ-ACK codebook corresponding to one group of DL SPS configurations in the M DL SPS configurations.

Optionally, in an embodiment, the first information includes the first HARQ-ACK feedback indication information, and the first HARQ-ACK feedback indication information corresponds to a plurality of the DL SPS configurations.

Optionally, in an embodiment, the determining module 902 is configured to: determine, based on the time domain resource indicated by the first information and a HARQ-ACK feedback timing corresponding to the DL SPS configuration j, the HARQ-ACK codebook corresponding to the DL SPS configuration j; or determine, based on the time domain resource indicated by the first information and a HARQ-ACK feedback timing set corresponding to the one group of DL SPS configurations, the HARQ-ACK codebook corresponding to the one group of DL SPS configurations.

Optionally, in an embodiment, the M DL SPS configurations correspond to W priorities, one HARQ-ACK codebook is generated for the M DL SPS configurations, and the one HARQ-ACK codebook includes HARQ-ACK information corresponding to the M DL SPS configurations; or the M DL SPS configurations correspond to W priorities, a maximum of W HARQ-ACK codebooks are generated for the M DL SPS configurations, and any one of the HARQ-ACK codebooks includes HARQ-ACK information for a DL SPS configuration corresponding to a priority of the any one of the HARQ-ACK codebooks; where 1≤W≤M, and W is an integer.

Optionally, in an embodiment, the HARQ-ACK codebook includes HARQ-ACK information, the HARQ-ACK information corresponds to a first SPS physical downlink shared channel PDSCH reception occasion between a time domain resource N0 and a time domain resource N1, and the first SPS PDSCH reception occasion corresponds to the MDL SPS configurations; or the HARQ-ACK codebook includes HARQ-ACK information of a first priority, the HARQ-ACK information of the first priority corresponds to a second SPS PDSCH reception occasion between the time domain resource N0 and the time domain resource N1, and the second SPS PDSCH reception occasion corresponds to a DL SPS configuration corresponding to the first priority in the M DL SPS configurations; or the HARQ-ACK codebook includes HARQ-ACK information of a first priority set, the HARQ-ACK information of the first priority set corresponds to a third SPS PDSCH reception occasion between the time domain resource N0 and the time domain resource N1, and the third SPS PDSCH reception occasion corresponds to a DL SPS configuration corresponding to the first priority set in the M DL SPS configurations; or the HARQ-ACK codebook includes HARQ-ACK information for a first DL SPS configuration, the HARQ-ACK information for the first DL SPS configuration corresponds to a fourth SPS PDSCH reception occasion between the time domain resource N0 and the time domain resource N1, and the fourth SPS PDSCH reception occasion corresponds to the first DL SPS configuration in the M DL SPS configurations; or the HARQ-ACK codebook includes HARQ-ACK information for a first DL SPS configuration set, the HARQ-ACK information for the first DL SPS configuration set corresponds to a fifth SPS PDSCH reception occasion between the time domain resource N0 and the time domain resource N1, and the fifth SPS PDSCH reception occasion corresponds to the first DL SPS configuration set in the M DL SPS configurations; where the time domain resource N0 and the time domain resource N1 are time domain resources for generating any HARQ-ACK codebook.

Optionally, in an embodiment, there is no other domain resource for generating a HARQ-ACK codebook between the time domain resource N0 and the time domain resource N1; or there is another domain resource for generating a HARQ-ACK codebook between the time domain resource N0 and the time domain resource N1, and there is an untransmitted HARQ-ACK codebook on the another domain resource for generating a HARQ-ACK codebook.

Optionally, in an embodiment, the HARQ-ACK codebook includes HARQ-ACK information, and the determining module 902 is further configured to: in a case that there is no SPS PDSCH transmission in SPS PDSCH reception occasions corresponding to the HARQ-ACK information, skip feeding back the HARQ-ACK codebook.

Optionally, in an embodiment, the HARQ-ACK codebook includes HARQ-ACK information, and the determining module 902 is further configured to: in a case that there is no SPS PDSCH transmission in some of SPS PDSCH reception occasions corresponding to the HARQ-ACK information, skip feeding back, in the HARQ-ACK codebook, target HARQ-ACK information, where the target HARQ-ACK information corresponds to the SPS PDSCH reception occasions with no SPS PDSCH transmission.

Optionally, in an embodiment, the determining module 902 is further configured to: determine, based on second information, whether to transmit the HARQ-ACK codebook on the time domain resource; where the second information includes at least one of the following: second HARQ-ACK feedback indication information, second TDD configuration information, second dynamic slot format information, uplink or downlink grant indication information, and a listen before talk LBT monitoring result of an unlicensed band.

Optionally, in an embodiment, the determining module 902 is configured to: in a case that the time domain resource collides with a downlink time domain resource indicated by the second information, or that the second information indicates that the time domain resource is unavailable, skip transmitting the HARQ-ACK codebook on the time domain resource or discard transmission of the HARQ-ACK codebook.

Optionally, in an embodiment, the determining module 902 is configured to: in a case that the time domain resource partially or completely overlaps an uplink time domain resource indicated by the second information, transmit the HARQ-ACK codebook on the time domain resource.

For the apparatus 900 according to this embodiment of this application, reference may be made to the processes of the method 200 in the corresponding embodiment of this application, and the units/modules of the apparatus 900 and other operations and/or functions described above are respectively intended to implement the corresponding processes in the method 200, with the same or equivalent technical effects achieved. For brevity, details are not described herein again.

The HARQ-ACK feedback apparatus in this embodiment of this application may be an apparatus, or may be a component, an integrated circuit, or a chip in a terminal. Such apparatus may be a mobile terminal, or may be a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like. This is not specifically limited in the embodiments of this application.

The HARQ-ACK feedback apparatus in this embodiment of this application may be an apparatus with an operating system. The operating system may be an Android operating system, may be an iOS operating system, or may be another possible operating system. This is not specifically limited in the embodiments of this application.

The HARQ-ACK feedback apparatus provided in this embodiment of this application is capable of implementing various processes that are implemented in the method embodiments of FIG. 2 to FIG. 8, with the same technical effects achieved. To avoid repetition, details are not described herein again.

Figure 10:
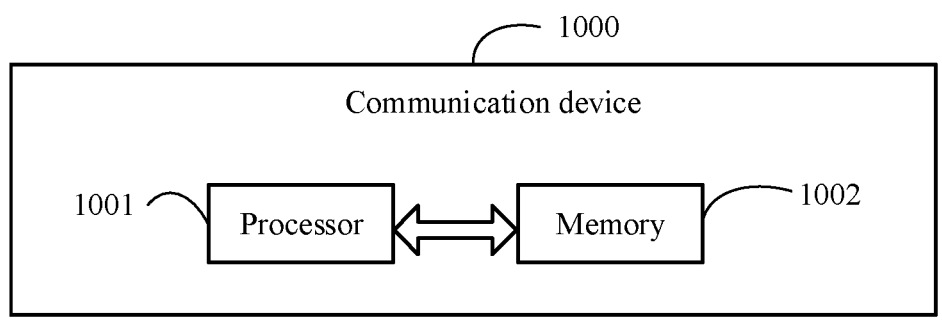
FIG. 10 is a schematic structural diagram of a communication device according to an embodiment of this application.

Optionally, as shown in FIG. 10, an embodiment of this application further provides a communication device 1000, including a processor 1001, a memory 1002, and a program or instructions stored in the memory 1002 and capable of running on the processor 1001. For example, in a case that the communication device 1000 is a terminal, when the program or instructions are executed by the processor 1001, the processes of the foregoing embodiments of the HARQ-ACK feedback method are implemented, with the same technical effects achieved. To avoid repetition, details are not described herein again.

Figure 11:
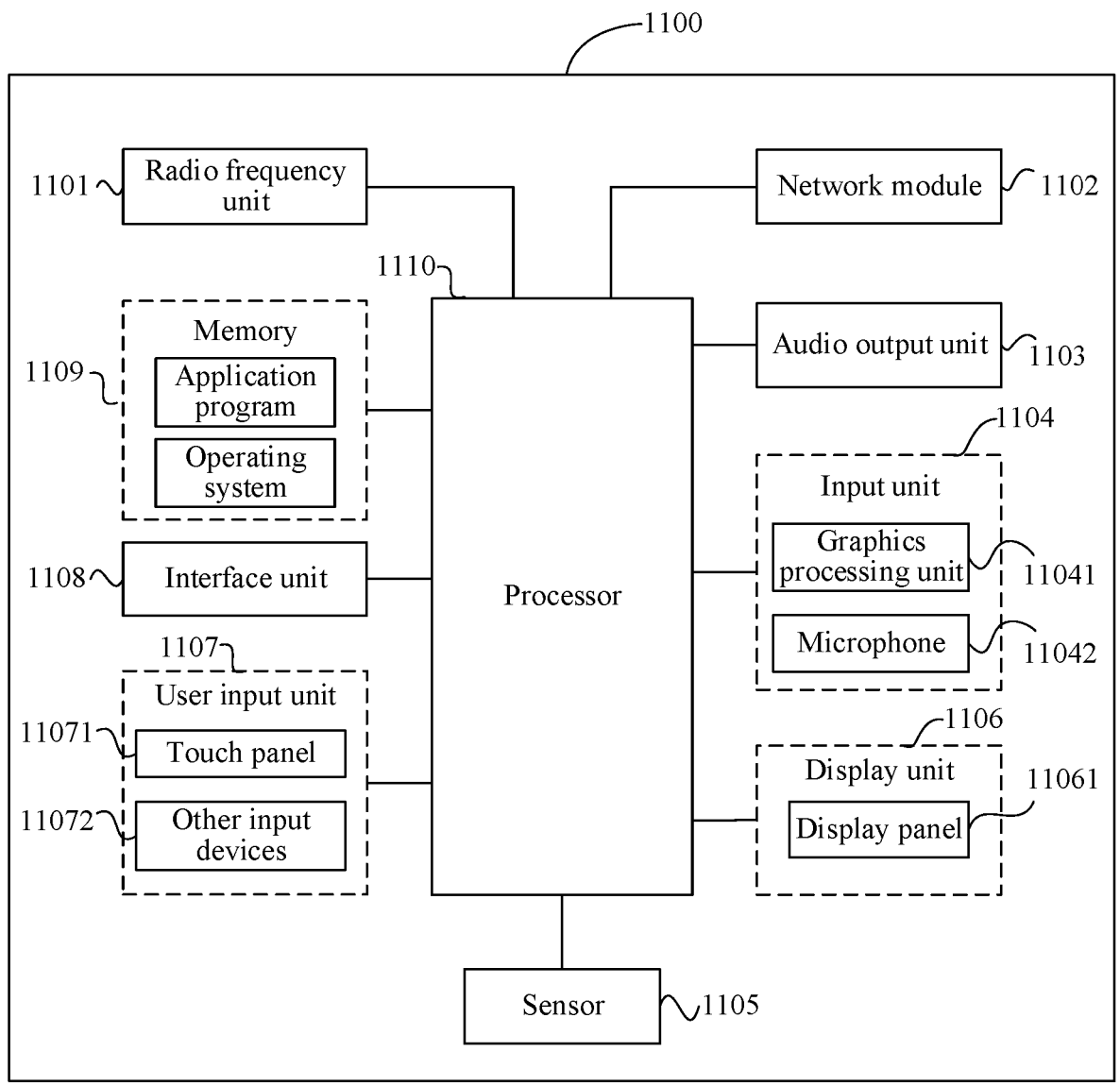
FIG. 11 is a schematic structural diagram of a terminal according to an embodiment of this application.

FIG. 11 is a schematic diagram of a hardware structure of a terminal for implementing the embodiments of this application.

The terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art can understand that the terminal 1100 may further include a power supply (such as a battery) for supplying power to the components. The power supply may be logically connected to the processor 1110 through a power management system. In this way, functions such as charge management, discharge management, and power consumption management are implemented by using the power management system. The terminal structure shown in FIG. 11 does not constitute a limitation to the terminal. The terminal may include more or fewer components than shown in the figure, or a combination of some components, or components disposed differently. Details are not described herein again.

It should be understood that in this embodiment of this application, the input unit 1104 may include a graphics processing unit (GPU) 11041 and a microphone 11042. The graphics processing unit 11041 processes image data of a static picture or a video that is obtained by an image capture apparatus (for example, a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a functional button (such as a volume control button or a power on/off button), a trackball, a mouse, and a joystick. Details are not described herein.

In this embodiment of this application, the radio frequency unit 1101 sends downlink information received from a network-side device to the processor 1110 for processing, and in addition, sends uplink data to the network-side device. Generally, the radio frequency unit 1101 includes but is not limited to an antenna, at least one amplifier, a transceiver, a coupler, a low noise amplifier, and a duplexer.

The memory 1109 may be configured to store software programs and various data. The memory 1109 may mainly include a program or instruction storage area and a data storage area. The program or instruction storage area may store an operating system, an application program or instructions required by at least one function (for example, an audio playing function and an image playing function), and the like. In addition, the memory 1109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another volatile solid-state storage device.

The processor 1110 may include one or more processing units. Optionally, the processor 1110 may integrate an application processor and a modem processor. The application processor mainly processes an operating system, a user interface, an application program, and the like. The modem processor mainly processes wireless communication, for example, a baseband processor. It should be understood that alternatively, the modem processor may not be integrated into the processor 1110.

The processor 1110 is configured to determine, based on first information, a HARQ-ACK codebook corresponding to M downlink semi-persistent scheduling DL SPS configurations; where the first information includes at least one of the following: first HARQ-ACK feedback indication information, first time division duplexing TDD configuration information, or first dynamic slot format information; and M≥1, and M is an integer.

In this embodiment of this application, when configured with M DL SPSs, the terminal can determine, based on at least one of first HARQ-ACK feedback indication information, first TDD configuration information, or first dynamic slot format information, a HARQ-ACK codebook corresponding to the M DL SPS configurations, and can further transmit the HARQ-ACK codebook, thereby improving communication effectiveness.

An embodiment of this application further provides a readable storage medium, where the readable storage medium stores a program or instructions, and when the program or instructions are executed by a processor, the processes of the foregoing embodiments of the HARQ-ACK feedback method are implemented, with the same technical effects achieved. To avoid repetition, details are not described herein again.

The processor is the processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the foregoing embodiments of the HARQ-ACK feedback method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A hybrid automatic repeat request-acknowledgement (HARQ-ACK) feedback method, applied to a terminal, wherein the method comprises:
   determining, based on first information, a HARQ-ACK codebook corresponding to M downlink semi-persistent scheduling (DL SPS) configurations; wherein
   the first information comprises at least one of the following: first HARQ-ACK feedback indication information, first time division duplexing (TDD) configuration information, or first dynamic slot format information; and M≥1, and M is an integer;
   in a case that the HARQ-ACK codebook is determined based on a first time domain resource indicated by the first HARQ-ACK feedback indication information, and the first time domain resource collides with a downlink time domain resource indicated by the first TDD configuration information, the method further comprises:
   determining, based on the first TDD configuration information, a second time domain resource for transmitting the HARQ-ACK codebook.

2. The method according to claim 1, wherein the method further comprises: determining, based on the first information, a time domain resource used for transmitting the HARQ-ACK codebook.

3. The method according to claim 1, wherein the determining, based on first information, a HARQ-ACK codebook corresponding to M DL SPS configurations comprises:
   determining, based on a time domain resource indicated by the first HARQ-ACK feedback indication information, the HARQ-ACK codebook corresponding to the M DL SPS configurations; or
   determining, based on a time domain resource indicated by the first HARQ-ACK feedback indication information, a HARQ-ACK codebook corresponding to M1 ones of the DL SPS configurations, wherein 1≤M1<M, and M1 is an integer.

4. The method according to claim 3, wherein the method further comprises:
   in a case that the time domain resource indicated by the first HARQ-ACK feedback indication information collides with a downlink resource, skipping generating a HARQ-ACK codebook based on the time domain resource.

5. The method according to claim 1, wherein the determining, based on first information, a HARQ-ACK codebook corresponding to M DL SPS configurations comprises:
   determining, based on a time domain resource indicated by the first TDD configuration information or by the first dynamic slot format information, the HARQ-ACK codebook corresponding to the M DL SPS configurations; or
   determining, based on a time domain resource indicated by the first TDD configuration information or by the first dynamic slot format information, a HARQ-ACK codebook corresponding to M1 ones of the DL SPS configurations, wherein 1≤M1<M, and M1 is an integer.

6. The method according to claim 1, wherein the determining, based on first information, a HARQ-ACK codebook corresponding to M DL SPS configurations comprises:
   determining, based on a time domain resource indicated by the first information, a HARQ-ACK codebook corresponding to a DL SPS configuration j in the M DL SPS configurations; or
   determining, based on a time domain resource indicated by the first information, a HARQ-ACK codebook corresponding to one group of DL SPS configurations in the M DL SPS configurations.

7. The method according to claim 1, wherein
   the M DL SPS configurations correspond to W priorities, one HARQ-ACK codebook is generated for the M DL SPS configurations, and the one HARQ-ACK codebook comprises HARQ-ACK information corresponding to the M DL SPS configurations; or
   the M DL SPS configurations correspond to W priorities, a maximum of W HARQ-ACK codebooks are generated for the M DL SPS configurations, and any one of the HARQ-ACK codebooks comprises HARQ-ACK information for a DL SPS configuration corresponding to a priority of the any one of the HARQ-ACK codebooks; wherein 1≤W≤M, and W is an integer.

8. The method according to claim 1, wherein
   the HARQ-ACK codebook comprises HARQ-ACK information, the HARQ-ACK information corresponds to a first SPS physical downlink shared channel PDSCH reception occasion between a time domain resource N0 and a time domain resource N1, and the first SPS PDSCH reception occasion corresponds to the M DL SPS configurations; or
   the HARQ-ACK codebook comprises HARQ-ACK information of a first priority, the HARQ-ACK information of the first priority corresponds to a second SPS PDSCH reception occasion between the time domain resource N0 and the time domain resource N1, and the second SPS PDSCH reception occasion corresponds to a DL SPS configuration corresponding to the first priority in the M DL SPS configurations; or
   the HARQ-ACK codebook comprises HARQ-ACK information of a first priority set, the HARQ-ACK information of the first priority set corresponds to a third SPS PDSCH reception occasion between the time domain resource N0 and the time domain resource N1, and the third SPS PDSCH reception occasion corresponds to a DL SPS configuration corresponding to the first priority set in the M DL SPS configurations; or
   the HARQ-ACK codebook comprises HARQ-ACK information for a first DL SPS configuration, the HARQ-ACK information for the first DL SPS configuration corresponds to a fourth SPS PDSCH reception occasion between the time domain resource N0 and the time domain resource N1, and the fourth SPS PDSCH reception occasion corresponds to the first DL SPS configuration in the M DL SPS configurations; or
   the HARQ-ACK codebook comprises HARQ-ACK information for a first DL SPS configuration set, the HARQ-ACK information for the first DL SPS configuration set corresponds to a fifth SPS PDSCH reception occasion between the time domain resource N0 and the time domain resource N1, and the fifth SPS PDSCH reception occasion corresponds to the first DL SPS configuration set in the M DL SPS configurations; wherein
   the time domain resource N0 and the time domain resource N1 are time domain resources for generating any HARQ-ACK codebook.

9. The method according to claim 1, wherein the HARQ-ACK codebook comprises HARQ-ACK information, and the method further comprises:
   in a case that there is no SPS PDSCH transmission in SPS PDSCH reception occasions corresponding to the HARQ-ACK information, skipping feeding back the HARQ-ACK codebook.

10. The method according to claim 1, wherein the HARQ-ACK codebook comprises HARQ-ACK information, and the method further comprises:
    in a case that there is no SPS PDSCH transmission in some of SPS PDSCH reception occasions corresponding to the HARQ-ACK information, skipping feeding back, in the HARQ-ACK codebook, target HARQ-ACK information, wherein the target HARQ-ACK information corresponds to the SPS PDSCH reception occasions with no SPS PDSCH transmission.

11. A terminal, comprising a processor, a memory, and a program or instructions stored in the memory and capable of running on the processor, wherein when the program or instructions are executed by the processor, an HARQ-ACK feedback method is implemented, wherein the method comprises:
    determining, based on first information, a HARQ-ACK codebook corresponding to M downlink semi-persistent scheduling (DL SPS) configurations; wherein
    the first information comprises at least one of the following: first HARQ-ACK feedback indication information, first time division duplexing (TDD) configuration information, or first dynamic slot format information; and M≥1, and M is an integer;
    in a case that the HARQ-ACK codebook is determined based on a first time domain resource indicated by the first HARQ-ACK feedback indication information, and the first time domain resource collides with a downlink time domain resource indicated by the first TDD configuration information, the method further comprises:
    determining, based on the first TDD configuration information, a second time domain resource for transmitting the HARQ-ACK codebook.

12. The terminal according to claim 11, wherein when the program or instructions are executed by the processor, further implements: determining, based on the first information, a time domain resource used for transmitting the HARQ-ACK codebook.

13. The terminal according to claim 11, wherein the determining, based on first information, a HARQ-ACK codebook corresponding to M DL SPS configurations comprises:

determining, based on a time domain resource indicated by the first HARQ-ACK feedback indication information, the HARQ-ACK codebook corresponding to the M DL SPS configurations; or determining, based on a time domain resource indicated by the first HARQ-ACK feedback indication information, a HARQ-ACK codebook corresponding to M1 ones of the DL SPS configurations, wherein 1≤M1<M, and M1 is an integer.

14. The terminal according to claim 13, wherein when the program or instructions are executed by the processor, further implements:

in a case that the time domain resource indicated by the first HARQ-ACK feedback indication information collides with a downlink resource, skipping generating a HARQ-ACK codebook based on the time domain resource.

15. The terminal according to claim 11, wherein the determining, based on first information, a HARQ-ACK codebook corresponding to M DL SPS configurations comprises:

determining, based on a time domain resource indicated by the first TDD configuration information or by the first dynamic slot format information, the HARQ-ACK codebook corresponding to the M DL SPS configurations; or determining, based on a time domain resource indicated by the first TDD configuration information or by the first dynamic slot format information, a HARQ-ACK codebook corresponding to M1 ones of the DL SPS configurations, wherein 1≤M1<M, and M1 is an integer.

16. The terminal according to claim 11, wherein the determining, based on first information, a HARQ-ACK codebook corresponding to M DL SPS configurations comprises:

determining, based on a time domain resource indicated by the first information, a HARQ-ACK codebook corresponding to a DL SPS configuration j in the M DL SPS configurations; or determining, based on a time domain resource indicated by the first information, a HARQ-ACK codebook corresponding to one group of DL SPS configurations in the M DL SPS configurations.

17. The terminal according to claim 11, wherein the M DL SPS configurations correspond to W priorities, one HARQ-ACK codebook is generated for the M DL SPS configurations, and the one HARQ-ACK codebook comprises HARQ-ACK information corresponding to the M DL SPS configurations; or the M DL SPS configurations correspond to W priorities, a maximum of W HARQ-ACK codebooks are generated for the M DL SPS configurations, and any one of the HARQ-ACK codebooks comprises HARQ-ACK information for a DL SPS configuration corresponding to a priority of the any one of the HARQ-ACK codebooks; wherein 1≤W≤M, and W is an integer.

18. The terminal according to claim 11, wherein the HARQ-ACK codebook comprises HARQ-ACK information, the HARQ-ACK information corresponds to a first SPS physical downlink shared channel PDSCH reception occasion between a time domain resource N0 and a time domain resource N1, and the first SPS PDSCH reception occasion corresponds to the M DL SPS configurations; or the HARQ-ACK codebook comprises HARQ-ACK information of a first priority, the HARQ-ACK information of the first priority corresponds to a second SPS PDSCH reception occasion between the time domain resource N0 and the time domain resource N1, and the second SPS PDSCH reception occasion corresponds to a DL SPS configuration corresponding to the first priority in the M DL SPS configurations; or the HARQ-ACK codebook comprises HARQ-ACK information of a first priority set, the HARQ-ACK information of the first priority set corresponds to a third SPS PDSCH reception occasion between the time domain resource N0 and the time domain resource N1, and the third SPS PDSCH reception occasion corresponds to a DL SPS configuration corresponding to the first priority set in the M DL SPS configurations; or the HARQ-ACK codebook comprises HARQ-ACK information for a first DL SPS configuration, the HARQ-ACK information for the first DL SPS configuration corresponds to a fourth SPS PDSCH reception occasion between the time domain resource N0 and the time domain resource N1, and the fourth SPS PDSCH reception occasion corresponds to the first DL SPS configuration in the M DL SPS configurations; or the HARQ-ACK codebook comprises HARQ-ACK information for a first DL SPS configuration set, the HARQ-ACK information for the first DL SPS configuration set corresponds to a fifth SPS PDSCH reception occasion between the time domain resource N0 and the time domain resource N1, and the fifth SPS PDSCH reception occasion corresponds to the first DL SPS configuration set in the M DL SPS configurations; wherein the time domain resource N0 and the time domain resource N1 are time domain resources for generating any HARQ-ACK codebook.

19. The terminal according to claim 11, wherein the HARQ-ACK codebook comprises HARQ-ACK information, and wherein when the program or instructions are executed by the processor, further implements:

in a case that there is no SPS PDSCH transmission in SPS PDSCH reception occasions corresponding to the HARQ-ACK information, skipping feeding back the HARQ-ACK codebook.

20. A chip, wherein the chip comprises a processor and a communication interface, the communication interface is coupled to the processor, and the processor is configured to run a program or instructions to implement an HARQ-ACK feedback method, wherein the method comprises:

determining, based on first information, a HARQ-ACK codebook corresponding to M downlink semi-persistent scheduling (DL SPS) configurations; wherein the first information comprises at least one of the following: first HARQ-ACK feedback indication information, first time division duplexing (TDD) configuration information, or first dynamic slot format information; and M≥1, and M is an integer;

in a case that the HARQ-ACK codebook is determined based on a first time domain resource indicated by the first HARQ-ACK feedback indication information, and the first time domain resource collides with a downlink time domain resource indicated by the first TDD configuration information, the method further comprises:

determining, based on the first TDD configuration information, a second time domain resource for transmitting the HARQ-ACK codebook.

* * * * *